(12) United States Patent
Ninan et al.

(10) Patent No.: US 11,893,700 B2
(45) Date of Patent: *Feb. 6, 2024

(54) LAYERED AUGMENTED ENTERTAINMENT EXPERIENCES

(71) Applicant: Dolby Laboratories Licensing Corporation, San Francisco, CA (US)

(72) Inventors: Ajit Ninan, San Jose, CA (US); Neil Mammen, San Jose, CA (US); Tyrome Y. Brown, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,770

(22) Filed: Apr. 28, 2022

(65) Prior Publication Data
US 2022/0254126 A1 Aug. 11, 2022

Related U.S. Application Data

(60) Continuation of application No. 17/240,954, filed on Apr. 26, 2021, now Pat. No. 11,361,520, which is a
(Continued)

(51) Int. Cl.
*G06T 19/00* (2011.01)
*G06T 15/00* (2011.01)
(Continued)

(52) U.S. Cl.
CPC .......... *G06T 19/006* (2013.01); *G06T 15/005* (2013.01); *H04N 13/156* (2018.05); *H04N 13/183* (2018.05); *H04N 21/8146* (2013.01)

(58) Field of Classification Search
None
See application file for complete search history.

(56) References Cited

U.S. PATENT DOCUMENTS 6,016,150 A 1/2000 Lengyel
6,803,912 B1 10/2004 Mark
(Continued)

FOREIGN PATENT DOCUMENTS

CN 1462416 A 12/2003
CN 101292516 A 10/2008
(Continued)

OTHER PUBLICATIONS

Stuart Cunningham, Jonathan Weinel, "Second Screen Comes to the Silver Screen: A Technological Feasibility Study Regarding Mobile Technologies in the Cinema", 2015, 2015 Internet Technologies and Applications (ITA), Wrexham, UK, pp. 228-232 (Year : 2015).*
(Continued)

*Primary Examiner* — Michael J Cobb

(57) ABSTRACT

Spatial information that describes spatial locations of visual objects as in a three-dimensional (3D) image space as represented in one or more multi-view unlayered images is accessed. Based on the spatial information, a cinema image layer and one or more device image layers are generated from the one or more multi-view unlayered images. A multi-layer multi-view video signal comprising the cinema image layer and the device image layers is sent to downstream devices for rendering.

21 Claims, 16 Drawing Sheets

Related U.S. Application Data division of application No. 16/604,118, filed as application No. PCT/US2018/026974 on Apr. 10, 2018, now Pat. No. 10,991,164.

(60) Provisional application No. 62/484,121, filed on Apr. 11, 2017.

(51) Int. Cl.
*H04N 13/156* (2018.01)
*H04N 13/183* (2018.01)
*H04N 21/81* (2011.01)
*A63F 13/26* (2014.01)

(56) References Cited

U.S. PATENT DOCUMENTS

| | | |
|---|---|---|
| 6,816,158 B1 | 11/2004 | Lemelson |
| 7,289,130 B1 | 10/2007 | Satoh |
| 7,403,201 B2 | 7/2008 | Takemoto |
| 7,580,378 B2 | 8/2009 | Carrender |
| 7,679,641 B2 | 3/2010 | Lipton |
| 9,049,431 B2 | 6/2015 | Broberg |
| 9,258,544 B2 | 2/2016 | Suh |
| 9,319,655 B2 | 4/2016 | Lee |
| 9,973,779 B2 | 5/2018 | Konstantinides |
| 10,078,917 B1 | 9/2018 | Gaeta |
| 2003/0038922 A1 | 2/2003 | Ferrell |
| 2007/0024644 A1* | 2/2007 | Bailey ............... G06F 3/011 345/633 |
| 2010/0238267 A1 | 9/2010 | Izzat |
| 2011/0037833 A1 | 2/2011 | Lee |
| 2011/0187706 A1 | 8/2011 | Vesely |
| 2011/0210965 A1 | 9/2011 | Thorpe |
| 2011/0286530 A1 | 11/2011 | Tian |
| 2013/0162641 A1 | 6/2013 | Zhang |
| 2013/0342575 A1 | 12/2013 | Coon |
| 2014/0304335 A1 | 10/2014 | Fung |
| 2015/0002374 A1 | 1/2015 | Erinjippurath |
| 2015/0156472 A1 | 6/2015 | Jang |
| 2015/0213648 A1 | 7/2015 | Wu |
| 2015/0213649 A1 | 7/2015 | Morishita |
| 2015/0214649 A1 | 7/2015 | Tziviskos et al. |
| 2015/0341661 A1 | 11/2015 | Alshina |
| 2016/0012642 A1* | 1/2016 | Lee ............... G06T 19/006 345/426 |
| 2016/0103330 A1 | 4/2016 | Nadler |
| 2016/0260258 A1 | 9/2016 | Lo |
| 2017/0038598 A1 | 2/2017 | Song |
| 2017/0078697 A1 | 3/2017 | Lee |
| 2017/0085867 A1 | 3/2017 | Baran |
| 2017/0251224 A1 | 8/2017 | Lee |
| 2018/0081178 A1 | 3/2018 | Shpunt |
| 2018/0120573 A1 | 5/2018 | Ninan |
| 2018/0293752 A1 | 10/2018 | Ninan |
| 2018/0295351 A1 | 10/2018 | Ninan |
| 2018/0295352 A1 | 10/2018 | Ninan |
| 2019/0174125 A1 | 6/2019 | Ninan |
| 2020/0296354 A1 | 9/2020 | Bickerstaff |

FOREIGN PATENT DOCUMENTS

| | | |
|---|---|---|
| CN | 101894267 | 11/2010 |
| CN | 101771830 B | 9/2012 |
| CN | 101305401 B | 12/2012 |
| CN | 102172033 B | 7/2013 |
| CN | 103718550 A | 4/2014 |
| CN | 105324738 | 2/2016 |
| CN | 103946734 B | 7/2017 |
| CN | 104899870 B | 8/2017 |
| CN | 105050671 B | 1/2018 |
| CN | 105794202 B | 8/2019 |
| EP | 1117074 A2 | 7/2001 |
| JP | 2001195601 | 7/2001 |
| JP | 2015507773 | 3/2015 |
| JP | 2015210580 A | 11/2015 |
| JP | 2016042680 A | 3/2016 |
| JP | 2018142162 | 9/2018 |
| KR | 1020110113752 | 10/2011 |
| KR | 20160108567 A | 9/2016 |
| RU | 2509440 | 3/2014 |
| RU | 2528080 | 9/2014 |
| RU | 2535176 | 12/2014 |
| WO | 2012128070 | 9/2012 |
| WO | 2013146385 A1 | 10/2013 |
| WO | 2016140655 A1 | 9/2016 |
| WO | 2017062957 A1 | 4/2017 |

OTHER PUBLICATIONS

Devernay, F. etal., Image and Geometry Processing for 3-d Cinematography, "Stereoscopic Cinema", pp. 11-51, Jan. 1, 2010.

Duane Q Nykamp, "Proper Subset Definition," Math Insight, retrieved from "https://mathinsight.org/definition/proper_subset", Accessed Sep. 30, 2021 (Year: 2021).

Learn Alberta, "Proper Subset",2021, retrieved from "https://www.learnalberta.ca/content/memg/division03/Proper%20Subset/ index.html", Accessed Sep. 30, 2021 (Year: 2021).

Smolic, A. et al., Three-Dimensional Video Postproduction and Processing, IEEE, New York, vol. 99, No. 4, Apr. 1, 2011 pp. 607-625.

* cited by examiner

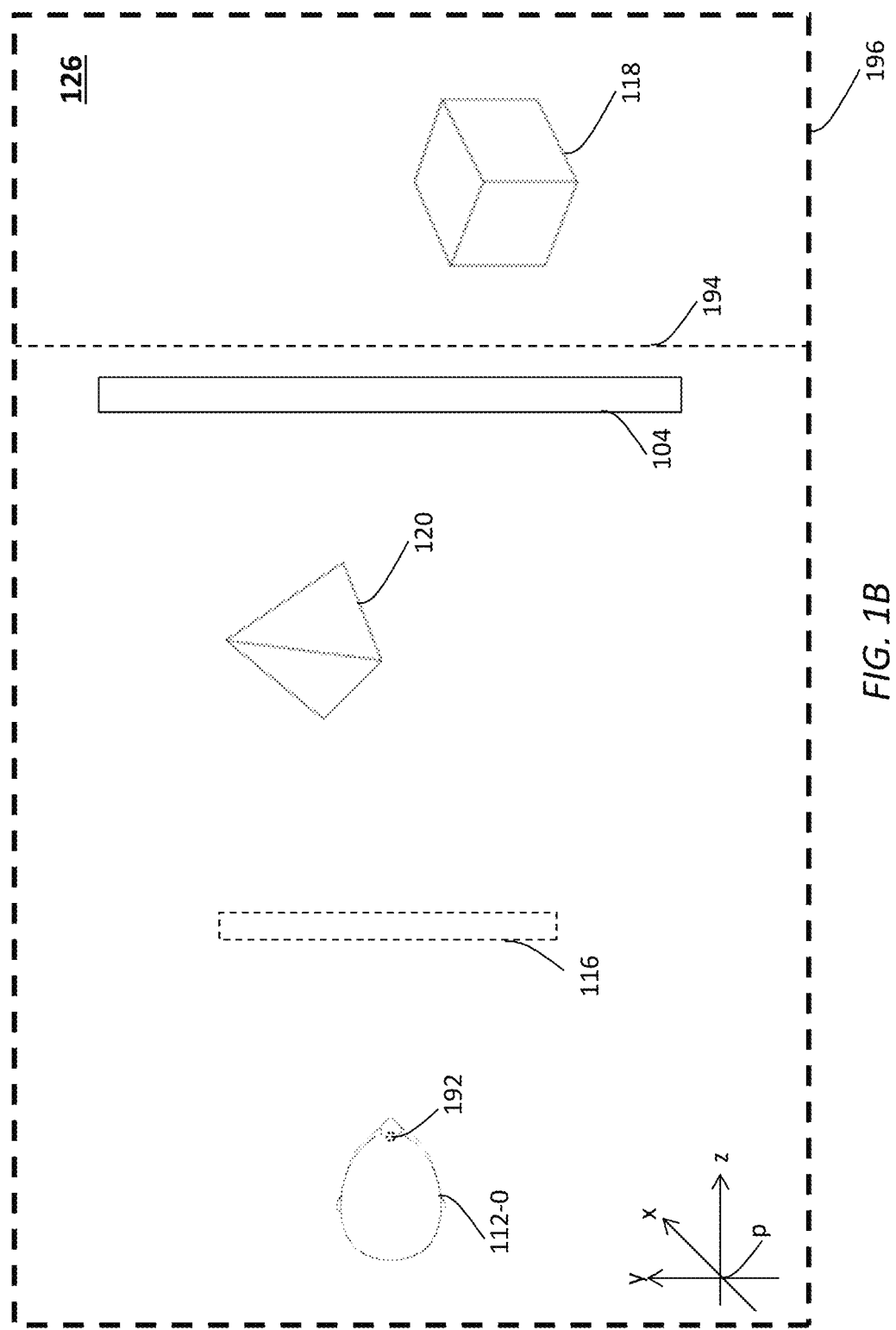

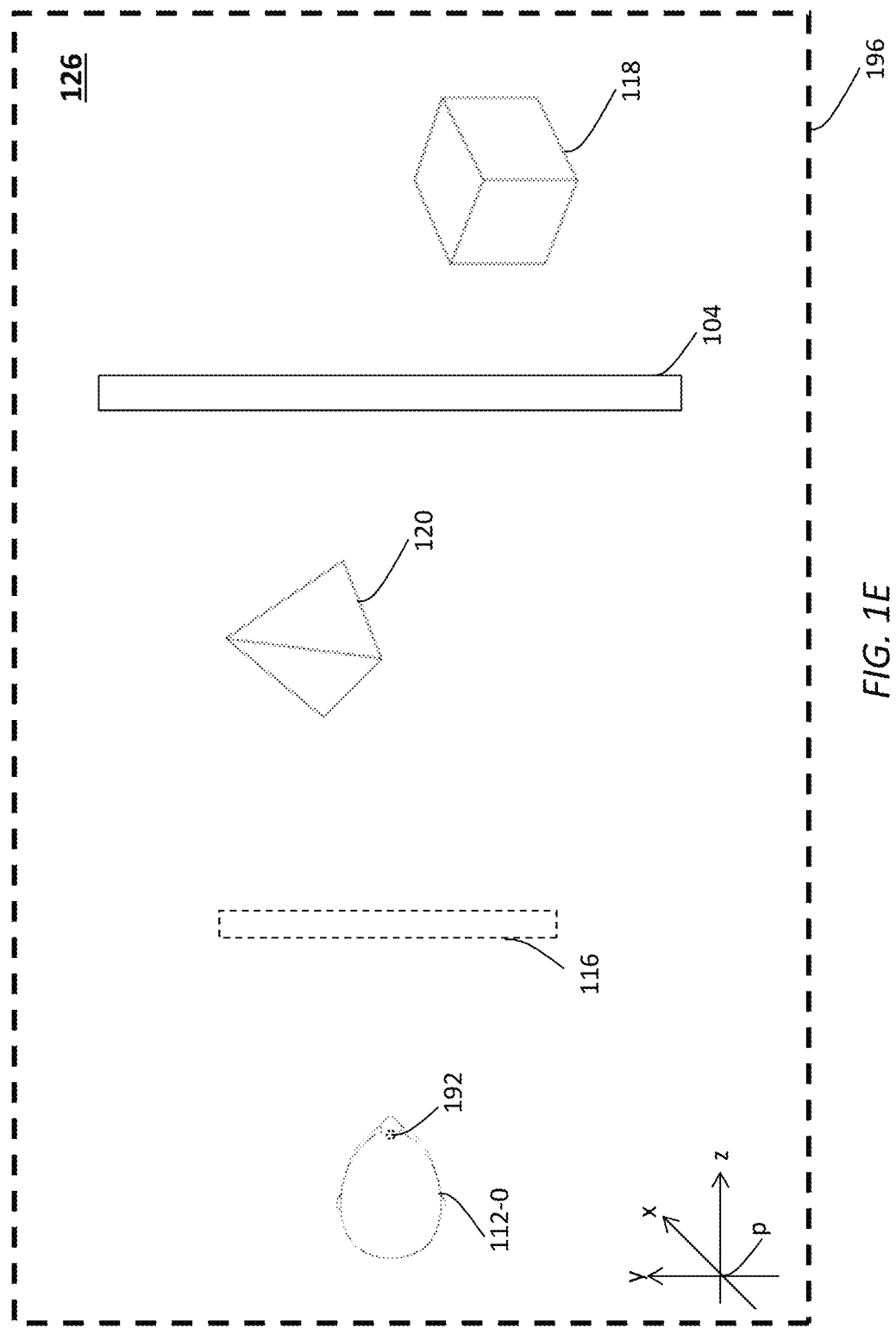

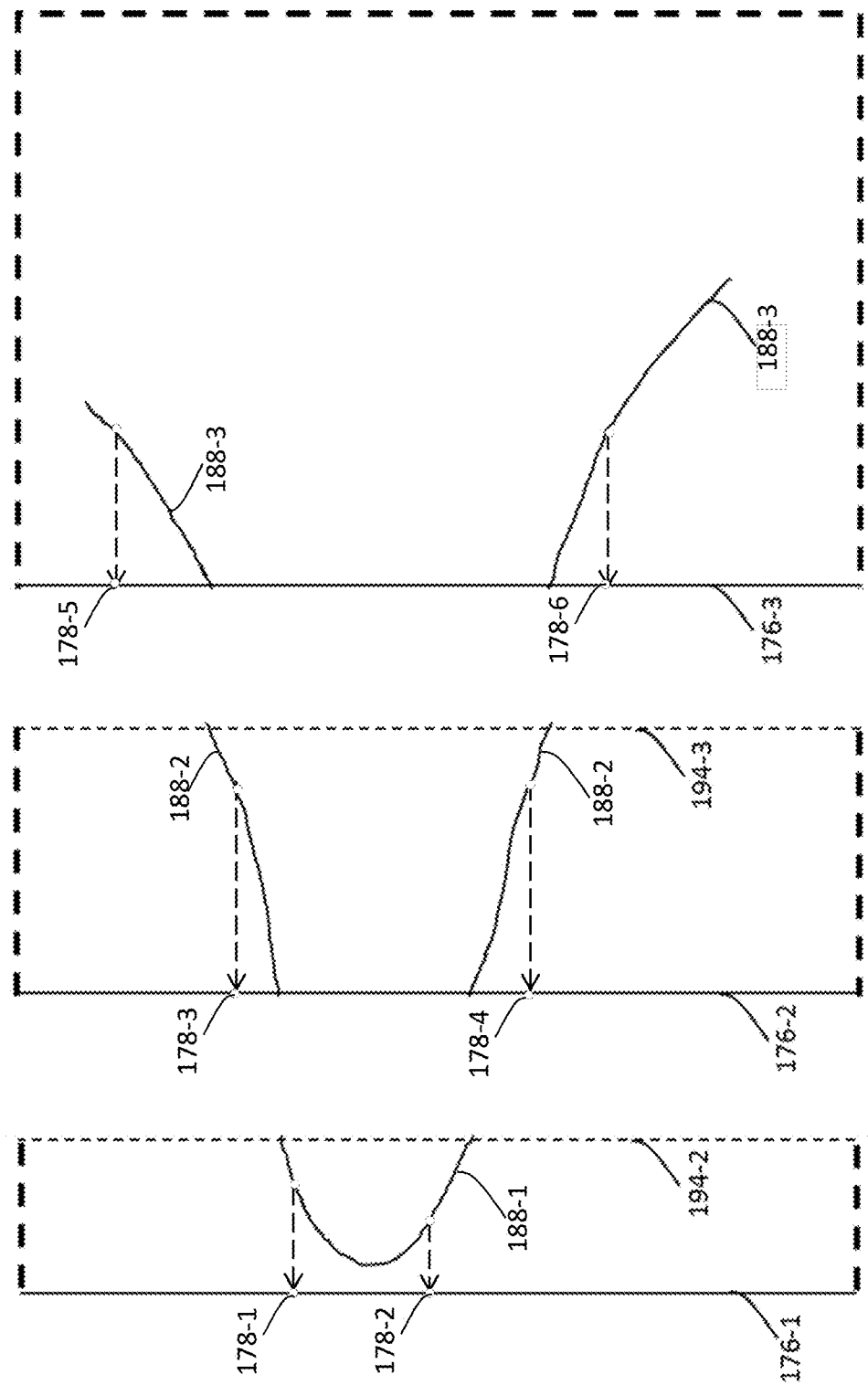

ND ENTERTAINMENT EXPERIENCES

LAYERED AUGMENTED ENTERTAINMENT EXPERIENCES

CROSS-REFERENCE TO RELATED APPLICATION

This application is a continuation of U.S. patent application Ser. No. 17/240,954, filed Apr. 26, 2021, which is a divisional of U.S. patent application Ser. No. 16/604,118, filed Oct. 9, 2019, (now issued U.S. Pat. No. 10,991,164) which is U.S. National Stage Entry of International Application No. PCT/US2018/026974, filed Apr. 10, 2018, which claims priority to U.S. Provisional Application No. 62/484,121, filed Apr. 11, 2017, which is incorporated herein by reference in its entirety.

TECHNOLOGY

The present invention relates generally to three-dimensional (3D) entertainment experiences, and in particular, to layered augmented 3D entertainment experiences.

BACKGROUND

When viewing a real-world object in a real-world scene, the human brain uses an accommodation process to control ciliary muscles to adapt each of eye lenses located behind pupils in the two eyes to certain focal lengths (or powers) to focus on the real-world object. At the same time, the human brain uses a vergence process to control extraocular muscles to simultaneously converge or diverge the two eyes toward the real-world object in order to support the perception of the real-world object as a 3D object.

By way of comparison, when viewing an object depicted in 3D images, the human brain uses an accommodation process to control the ciliary muscles to fix the eye lenses of the viewer's eyes to focus on a (e.g., cinema, etc.) display in order to support the clear vision of the 3D images rendered on the display, regardless of where the depicted object in the 3D images is supposed to be located. At the same time, the human brain uses a vergence process to control the extraocular muscles to simultaneously converge or diverge the eyes toward the depicted object in the 3D images in order to support the perception of the depicted object as a 3D object.

If the depicted object is of a relatively large negative parallax and thus is visually perceived as relatively close to the eyes in front of the display, the accommodation process still tries to fix the eyes on the display while the vergence process seeks to converge or diverge the eyes to the depicted object at a relatively close distance, thereby causing an accommodation-vergence conflict. This accommodation-vergence conflict in 3D image viewing is prone to inducing serious physiological discomforts/sickness; therefore, relatively large negative parallaxes are rarely used, especially for cinema 3D entertainment experiences.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1B through FIG. 1E illustrate an example 3D space in which a viewer is to view the plurality of visual objects as depicted in the multi-view image, with a cinema display and a device display of a wearable device;

FIG. 1G illustrates example single-layer images from the unlayered view image generated based on a tensor map.

DESCRIPTION OF EXAMPLE EMBODIMENTS

Figure 1A:
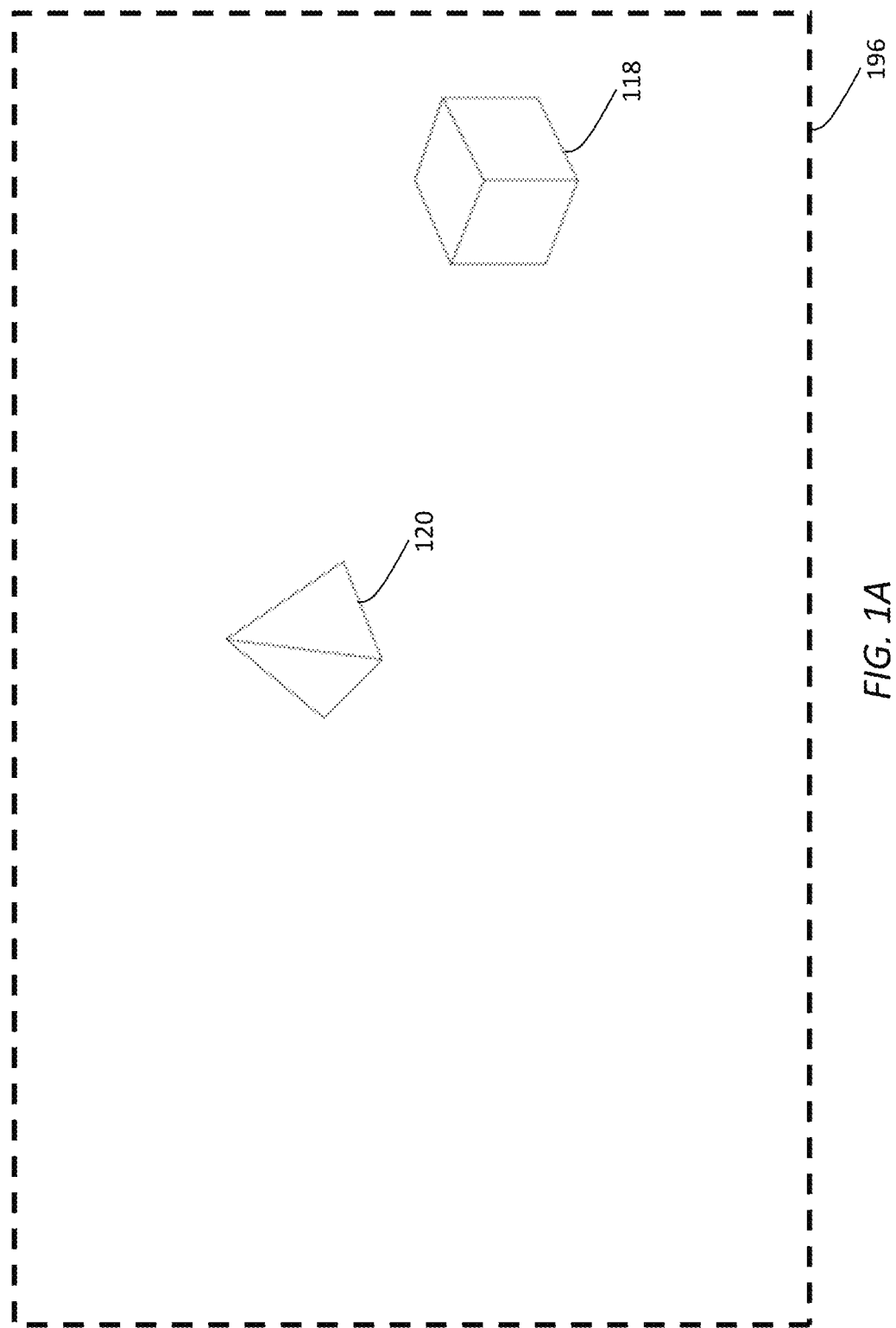
FIG. 1A illustrates example 3D visual objects depicted in a multi-view image.

Example embodiments, which relate to layered augmented 3D entertainment experiences, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. AUGMENTED ENTERTAINMENT EXPERIENCE
3. LAYERED IMAGE GENERATION
4. TENSOR MAP
5. LAYERED IMAGE ENCODER AND AUGMENTED ENTERTAINMENT SYSTEM
6. EXAMPLE PROCESS FLOWS
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used with 3D technologies to provide augmented entertainment experiences, in which a viewer can use a combination of a shared display and an individual device display of the viewer's wearable device to view images that depict 3D objects in a unified image space. By way of example but not limitation, the shared display may be a cinema display, such as one associated with any of: Dolby 3D, RealD, linear polarization based 3D, circular polarization based 3D, spectral spatial separation based 3D, etc. The device display of the wearable device may be a movable display in relation to the shared display, such as one associated with an image projector, an AR display, a HoloLens display, a Magic Leap display, a Mixed Reality (MR) display, a tensor display, a volumetric display, a light field (LF) display, an Immy display, a Meta display, a relatively simple pair of AR glasses, a display with any in a wide range of capabilities of overcoming the accommodation-vergence conflict, etc. Example wearable devices and device displays can be found in U.S. patent application Ser. No. 15/945,237, with an application title of "AUGMENTED 3D ENTERTAINMENT SYSTEMS" by Ajit Ninan and Neil Mammen, filed on 4 Apr. 2018, the entire contents of which are hereby incorporated by reference as if fully set forth herein.

2D or 3D cinema images can be displayed on the cinema display. A viewer who is watching the cinema images can simultaneously see (or visually perceive) additional 3D objects or additional 3D depth information in device images rendered on the device displays. Some of the additional 3D objects depicted in the device images can appear to be popped out of the cinema display in front of the viewer. The viewer can track any of these 3D objects as if such 3D object were actually present in a 3D (physical) space in which the viewer is located. As the viewer moves around the 3D object, the viewer can see previously occluded visual details of the 3D object around the 3D object with an added/augmented dimension or depth of realism. Thus, through the combination of the device images and the cinema images, the viewer can get a (e.g., psychovisual, psychophysical, etc.) feeling of the object being floating around, by seeing different parallax in response to the head movements of the viewer.

The device display can be set to be virtually or physically located relatively close to the viewer at one or more image planes. Thus, even when the viewer is viewing the 3D objects depicted in the device images that may be located relatively close to the viewer as compared with objects depicted in the cinema images, the 3D objects depicted in the device images are still of positive parallax relative to the device display (or the image planes associated with the device display) on which the device images are rendered. Thus, the accommodation-vergence conflict that would be caused under other approaches can be averted or greatly ameliorated under techniques as described herein. The device display can display or project device display images at a single image plane of a single distance or at multiple image planes of multiple different distances (e.g., through time-division multiplexing, etc.) in front of the viewer. These distances of the image planes can be fixed or auto tunable. Example device displays with image plane(s) of auto tunable distance(s) from viewers can be found in U.S. patent application Ser. No. 15/798,274, with an application title of "EYEWEAR DEVICES WITH FOCUS TUNABLE LENSES," filed on 30 Oct. 2017, the entire contents of which are hereby incorporated by reference as if fully set forth herein.

Thus, a wearable device under techniques as described herein offers a viewer at least two image planes of different depths at which cinema and device images are rendered synchronously. A first image plane of the at least two image planes corresponds to that of the cinema display, whereas one or more second image planes of the at least two image planes correspond to those of the device display.

Visual objects depicted in multi-view unlayered (e.g., pre-layered, non-layered, monolithic, unitary, etc.) images can be located virtually in various spatial locations in a 3D image space represented in the multi-view images. As used herein, a multi-view unlayered image refers to a multi-view image to which layered image generation operations are to be applied.

Based on the spatial locations, the visual objects depicted in the multi-view unlayered images may be partitioned into different image layers. For each multi-view unlayered image, each of the image layers comprises single-layer images depicting a subset of the visual objects.

Among the different image layers, a cinema image layer may comprise single-layer images depicting a subset of visual objects in the multi-view unlayered images that are relatively far from a viewer at a reference spatial location such as those near or behind the cinema display. One or more device image layers may comprise single-layer images depicting one or more subsets of visual objects in the multi-view unlayered images that are relatively close to the viewer at the reference spatial location such as those appearing to be popped in front of the viewer out of the cinema display.

The single-layer images in the cinema image layer can be used to derive the cinema display images that are to be rendered on the cinema display, whereas the single-layer images in the device image layers can be used to derive the device display images that are to be rendered with the device display of the wearable device. The 3D image space can be anchored or projected in the 3D physical space using the portion of the 3D image space depicted in the cinema display images rendered on the cinema display. The other portions of the 3D image space depicted in the device display images can be transformed spatially to seamlessly adjoin with the portion of the 3D image space depicted in the cinema display images. Different spatial transformations may be applied to different wearable devices depending on respective spatial locations and/or spatial directions of the wearable devices so that the other portions of the 3D image space as individually depicted in the different wearable devices can seamlessly adjoin with the portion of the 3D image space depicted in the cinema display images.

A single image renderer or multiple image renderers can be used to simultaneously drive cinema image rendering operations and device image rendering operations. Multiple viewers present in the 3D space (e.g., a cinema, a movie theater, etc.) may register their wearable devices with the image renderers to experience an augmented entertainment session.

In some embodiments, the wearable devices can be automatically registered. For example, a device tracker can be deployed in the 3D space to track/monitor spatial positions and spatial directions of the wearable devices in the 3D space. Additionally, optionally or alternatively, the device tracker can obtain device ID information for the wearable devices such as MAC addresses, network addresses, IP addresses, etc., through remote device tracking/monitoring.

The device ID information, spatial positions and spatial directions of the wearable devices may be used to register the wearable devices and to deliver device display images to the registered wearable devices at the correct MAC addresses, network addresses, IP addresses, etc. Example device tracking can be found in U.S. patent application Ser. No. 15/949,536, with an application title of "PASSIVE MULTI-WEARABLE-DEVICES TRACKING" by Ajit Ninan and Neil Mammen, filed on 10 Apr. 2018, the entire contents of which are hereby incorporated by reference as if fully set forth herein.

Under techniques as described herein, multiple display images derived from different image layers can be simultaneously rendered on the device display and the cinema display, and can provide or reconstruct a seamless appearance of the 3D image space with all the visual objects located at the same spatial locations as previously depicted in the original multi-view unlayered images, from which the multiple display images of different image layers are directly or indirectly derived.

A multi-view unlayered image may comprise unlayered (single) view images that corresponds to different views (e.g., viewing directions, fields of views, etc.). Based on depth information associated with each unlayered view image in the multi-view unlayered image, a tensor map (e.g., of order 3, in the x, y, z dimensions/coordinates/axes, etc.) may be constructed in layered image generation operations to generate a pixel distribution of the unlayered view image in the multi-view unlayered image in the 3D image space. A pixel in the pixel distribution generated from the tensor map is represented in the x, y and z dimensions/coordinates/axes (e.g., columns of an image frame, row of the image frame, depth etc.). Given the tensor map, single-layer images may be generated, for example with layer-separation surfaces. The tensor-map based image layer generation operations may be applied to each view image in the view images in the multi-view unlayered image to generate single-layer images for each such view image in different image layers.

Tensor maps may also be used in image rendering operations. For example, when the single-layer images are used to generate display images for rendering with a wearable device of a viewer, the single-layer images or the display images can be spatially transformed based on the actual spatial position and the actual spatial direction of the wearable device by translation, rotation, scaling, etc.

Cinema display images generated from the single-layer images in the cinema image layer may be used with depth information to construct a portion of a tensor map that corresponds to a portion of the 3D image space. Device display images generated from the single-layer images in the one or more device image layers may be used with depth information to construct other portions of the 3D image space. The device display images may be generated individually for a wearable device based on a specific spatial position and/or a specific spatial direction of the wearable device with constraints that other portions of the tensor map constructed from the device display images seamlessly adjoining with the portion of the same tensor map constructed from the cinema display images. Thus, under techniques as described herein, a 3D image space as rendered by the combination of the cinema display images and the device display images accurately or faithfully reproduce the 3D image space as originally depicted in the multi-view unlayered image.

Example embodiments described herein relate to generating image layers. Spatial information that describes spatial locations of a plurality of visual objects as in a three-dimensional (3D) image space as represented in one or more multi-view unlayered images is accessed. Each of the one or more multi-view unlayered images comprises a plurality of single-view unlayered images corresponding to a plurality of viewing directions. Based on the spatial information that describes the spatial locations of the plurality of visual objects in the 3D image space as represented in the one or more multi-view unlayered images, performing: generating, from the one or more multi-view unlayered images, a cinema image layer comprising one or more single-layer cinema images depicting a first proper subset of one or more visual objects in the plurality of visual objects; generating, from the one or more multi-view unlayered images, one or more device image layers each of which comprises one or more single-layer device images depicting one or more second proper subsets of one or more visual objects in the plurality of visual objects; etc. A multi-layer multi-view video signal comprising the one or more single-layer cinema images in the cinema image layer and the one or more single-layer device images in the one or more device image layers is sent to one or more downstream devices for rendering.

Example embodiments described herein relate to rendering cinema display images and device display images generated from image layers. A multi-layer multi-view video signal comprising one or more single-layer cinema images in a cinema image layer and one or more single-layer device images in one or more device image layers is received. The single-layer cinema images in the cinema image layer and the single-layer device images in the one or more device image layers were previously derived from one or more multi-view unlayered images. The one or more single-layer cinema images are retrieved from the cinema image layer of the multi-layer multi-view video signal. The one or more single-layer cinema images depict a first proper subset of one or more visual objects in a plurality of visual objects as originally depicted by the one or more multi-view unlayered images. The one or more single-layer device images are retrieved from the one or more device image layers of the multi-layer multi-view video signal. The one or more device images depict one or more second proper subsets of one or more visual objects in the plurality of visual objects as originally depicted by the one or more multi-view unlayered images. The first proper subset of visual objects as depicted in the one or more first multi-view single-layer images is caused to be rendered to a viewer on a cinema display in a 3D space. The one or more second proper subsets of visual objects as depicted in the one or more second multi-view single-layer images are caused to be rendered concurrently to the viewer on a device display in the 3D space. The first proper subset of visual objects as rendered on the cinema display and the one or more second proper subsets of visual objects as rendered on the device display collective depict the plurality of visual objects located at the same spatial locations in a 3D image space, as originally depicted by the one or more multi-view unlayered images. Spatial information describing the spatial locations in the 3D image space at which the plurality of visual object is located was previously used to partition the plurality of visual objects, as originally depicted by the one or more multi-view unlayered images, into the cinema image layer and the one or more device image layers.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Augmented Entertainment Experience

In some example embodiments, techniques as described herein can be used to present integrated (e.g., 3D, multi-view, etc.) image content with shared displays (e.g., cinema displays, etc.) and device displays of wearable devices to augment/enhance entertainment experiences of viewers. While viewing cinema image content on a cinema display, a viewer can simultaneously view device image content rendered with a device display of a wearable device used by the viewer. The cinema image content and the device image content, which can be derived from multi-view unlayered images, collectively present all visual objects originally depicted in the same multi-view unlayered images.

The wearable device and its accompanying device display represent an addition to a cinema display, a flat entertainment screen such as a TV, etc. For example, the wearable device may be a pair of AR glasses worn by the viewer. The wearable device can implement left and right eye separation technologies to view 3D content on the cinema display. At the same time, the wearable device (or imagers therewith) can render device image content synchronously with the rendering of 2D or 3D cinema image content on the cinema display. Thus, the wearable device can add a new dimension or a new range of depth to the dimension or range of depth which otherwise could be provided by the cinema display alone.

In the case of 3D cinema image content being rendered on the cinema display, the device image content rendered on the wearable device can be 3D device image content. In some embodiments, the 3D device image content as rendered by the wearable device may (e.g., mostly, substantially, partly, etc.) focus on visual objects between the viewer and the cinema display. Such 3D image content portions would be of negative parallax and depth if rendered on the cinema display. By way of comparison, under techniques as described herein, the 3D image content portions between the viewer and the cinema display may be displayed by the wearable device with positive parallax and depth. Thus, a largely comfortable transition can be provided to the viewer between visual objects of positive parallax as rendered on the cinema display and visual objects of also positive parallax as rendered by the wearable device.

In the case of 2D cinema image content being rendered on the cinema display, the device image content rendered on the AR glasses can be 3D device image content that complements the 2D cinema image content. The 3D device image content as rendered by the wearable device may (e.g., mostly, substantially, partly, etc.) focus on 3D image content portions in the overall image content that depict visual objects as 3D objects between the viewer and the cinema display and optionally behind the cinema display relative to the viewer, with proper occlusions and/or disocclusions of 3D details depending on spatial positions and/or spatial directions of the wearable device. Some of these 3D image content portions would be of negative parallax and depth if rendered on the cinema display. By way of comparison, under techniques as described herein, all the 3D image content portions between the viewer and the cinema display and even behind the cinema display may be displayed by the AR glasses with positive parallax and depth. Thus, a largely comfortable and seamless transition can be provided to the viewer when the viewer tracks visual objects as rendered on the cinema display and as rendered with the wearable device.

In contrast with other approaches that either limit visual objects to a very shallow depth in front of the cinema display or that attempt to increase depth by displaying visual objects with relatively large negative parallax, the approach under the techniques as described herein can be used to display visual objects with a relatively large depth in front of the cinema display without introducing relatively large negative parallax. Thus, the techniques as described herein can provide effective solutions to prevent or resolve the accommodation-vergence conflict.

When only the cinema display (without a wearable device as described herein) is used to render 3D visual objects, a specific 3D visual object may transition from being behind the cinema display to being in front of the cinema display. If the specific 3D visual object is too far from the cinema display, the cinema image content may not be able to render the specific 3D visual object as the specific 3D visual object may move out of a solid viewing angle range supported by the cinema display.

By comparison, under techniques as described herein, the specific 3D visual object can be displayed or rendered with the wearable device to support a much greater viewing angle range than that could otherwise be supported by the cinema display alone. Thus, the viewer may continue to visually track the specific 3D visual object within the much greater viewing angle range without being limited or constrained to the solid angle supported by the cinema display alone.

Techniques as described herein can be implemented with any combination of a shared display in a wide variety of shared displays and a wearable device in a wide variety of wearable devices. Instead of displaying 3D images with a single shared display or a single dedicated display, multiple displays can be used simultaneously to display multiple image layers generated from the same multi-view image content. Each of these image layers can be rendered to depict visual objects of positive parallax or depth (or no greater than a tolerable amount of negative parallax). Example wearable devices include, but are not necessarily limited to only, some or all of: an image projector, an AR display, a HoloLens display, a Magic Leap display, a Mixed Reality (MR) display, a tensor display, a volumetric display, a light field (LF) display, an Immy display, a Meta display, a relatively simple pair of AR glasses, a display with any in a wide range of capabilities of overcoming the accommodation-vergence conflict, etc.

The wearable device can be a relatively simple AR system that projects, focuses on a single image plane (e.g., a virtual display, a real display, a LF display, etc.) of a relatively close distance or accommodation point. The viewer may be given options to use the wearable device to avoid negative parallax and/or to view additional 3D image content or visual objects synchronously in addition to 2D or 3D image content or visual objects presented with the cinema display at a depth range supported by the cinema display. Thus, differentiated viewing experiences may be provided to viewers and to trick the mind into thinking the multiple image layers rendered on multiple displays with multiple depths as actually the overall image content rendered on a single display of a powerful range of depth. The human brain can readily accept (or can be readily adapted into) these perceptions, as the augmented entertainment experiences as described herein are physiologically more comfortable than a viewing experience with relatively large negative parallax and represent a lower psychological acceptance threshold that a psychological acceptance threshold represented by the viewing experience with the relatively large negative parallax.

3. Layered Image Generation

FIG. 1A illustrates example 3D visual objects (e.g., 118, 120, etc.) depicted in a multi-view unlayered image. A multi-view unlayered image may comprise a plurality of unlayered (single) view images that corresponds to a plurality of different views (e.g., viewing directions, fields of views, etc.). Each unlayered view image in the plurality of unlayered view images of the multi-view unlayered image may correspond to a respective view in the plurality of different views. For example, a multi-view unlayered image may comprise a first unlayered view image that corresponds to a left view (e.g., to be rendered to the left eye of a viewer, etc.)

and a second unlayered view image that corresponds to a right view (e.g., to be rendered to the right eye of the viewer, etc.).

In some embodiments, the multi-view unlayered image depicts a plurality of (3D) visual objects in a 3D image space 196. For simplicity, only two (3D) visual objects (120 and 118) are in the 3D image space (196) as illustrated in FIG. 1A. It should be noted, however, that a multi-view unlayered image as described herein may depict any number of (3D) visual objects. Example visual objects may include, but are not necessarily limited to, humans, avatars, computer-generated figures, animals, plants, mountains, rivers, sky, houses, parks, bridges, airplanes, cars, ships, or other visual objects that can be rendered to and perceived by the human vision system, etc.

The multi-view unlayered image may be acquired/captured/composited from a physical or virtual 3D scene by any combination of a wide variety of capture devices, which may be physically or virtually present at the 3D scene. In some embodiments, a visual object model may be used to render or generate some or all image portions in the multi-view unlayered image. Example capture devices include, but are not limited to, studio cameras, multi-view cameras, light field cameras, cameras comprising micro-lens elements, HDR cameras, mobile phone cameras, cameras that are integrated with computing devices, cameras that operate in conjunction with computing devices, non-professional cameras, professional cameras, virtual cameras, computer image generators, computer image renderers, computer graphics generators, computer animators, virtual image generators, etc. It should be noted that the 3D scene from which the multi-view unlayered image is derived may be entirely a physical 3D scene, entirely a virtual 3D scene, or a combination of one or more physical 3D scenes and/or one or more virtual 3D scenes.

The 3D image space (196) may represent a portion of the 3D scene from which the multi-view unlayered image is acquired/captured/composed. Examples of the 3D image space (196) may include, but are not necessarily limited to only, one of: the entire 3D scene, one or more salient portions of the 3D scene, one or more detailed portions of the 3D scene, a relatively large, a relatively small, and the like.

FIG. 1B illustrates an example 3D space 126 in which a viewer is located to view the plurality of visual objects in the 3D image space (196) through images rendered with (image) displays such as a cinema display 104, a device display 116 of a wearable device used by the viewer, etc.

Examples of the 3D space (126) may include, but are not necessarily limited to only, any of: a reference 3D space, a physical space, a cinema, a theater, a concert hall, an auditorium, an amusement park, a bar, a home, a room, an exhibition hall, a venue, a bar, a ship, an airplane, etc. The 3D space (126) may be a three-dimensional volume spatial positions in which can be represented in a three-dimensional spatial coordinate system (e.g., a reference coordinate system, a world coordinate system, etc.) stationary relative to the 3D space (126).

By way of illustration but not limitation, the stationary three-dimensional spatial coordinate system used to represent spatial positions in the 3D space (126) may be a reference Cartesian coordinate system depicted in the lower left corner of the 3D space (126). The reference Cartesian coordinate system may comprise a coordinate system origin at a reference spatial position denoted as "p" as shown in FIG. 1B. The reference spatial position "p" may be selected from any spatial position stationary to the 3D space (126).

The 3D image space (196) depicted in the multi-view unlayered image may or may not be of the same size (or co-extensive) as that of the 3D space (126) in which the displays are used to rendered the plurality of visual objects in the multi-view unlayered image. Depending on specific image content (e.g., broad landscape, small room, etc.) or display applications related to the multi-view unlayered image, the 3D image space (196) as rendered may be (e.g., much, etc.) larger or smaller than the 3D space (126) in which the viewer (112-0) and the displays (e.g., 104, 116, etc.) are located.

Rendering the plurality of visual objects under techniques as described herein allows the viewer (112-0) to have user experience of being present in the 3D image space (196), as if the 3D space (126) in which the viewer (112-0) is located were merged, fused or projected into the 3D image space (196), or as if the visual objects (e.g., 118, 120, etc.) were actual 3D objects present in, or as a part of, the 3D space (126).

In some embodiments, an augmented entertainment system implementing some or all of the techniques as described herein takes single-layer images in a plurality of image layers that were previously generated by an upstream device such as a layered image encoder (e.g., 180 of FIG. 2A, etc.), etc., from the multi-view unlayered image, generates cinema display images and device display images from the received single-layer images, and renders the cinema display images and the device display images on multiple displays (e.g., 104, 116, etc.) in the 3D space (126) including device displays of wearable devices used by viewers, instead of directly rendering the multi-view unlayered image (or single-view unlayered images therein) on a single display in the 3D space (126).

In some embodiments, the upstream device or the layered image encoder (180 of FIG. 2A) accesses spatial information that describes spatial locations of each visual object in the plurality of visual objects in the 3D image space (196) as depicted in the multi-view unlayered image. Examples of the spatial information may include, but are not necessarily limited to only, one or more of: depth image, disparity information, epipolar information, 3D mesh, etc.

Based on the spatial information that describes the spatial locations of the plurality of visual objects in the 3D image space (196) as represented in the one or more multi-view unlayered images, the layered image encoder (180 of FIG. 2A) generates the plurality of image layers from the multi-view unlayered image.

Each image layer in the plurality of image layers comprises one or more multi-view single-layer images depicting a proper subset of one or more visual objects in a plurality of visual objects (e.g., originally, previously, etc.) depicted in the multi-view unlayered image.

Any combination of a variety of selective factors, spatial relationship thresholds, spatial relationship criteria, etc., may be used to select visual objects, from among the plurality of visual objects depicted in the multi-view unlayered image, to be included in a particular image layer in the plurality of image layers. Example selective factors, spatial relationship thresholds, spatial relationship criteria, etc., include, but are not necessarily limited to only, one or more of: spatial locations of displays in the 3D space (126); spatial locations of the viewer (112-0) in the 3D space (126); spatial positions of visual objects in relation to the spatial locations of the displays or the viewer (112-0); spatial directions of visual objects in the 3D space (126) relative to the viewer (112-0); relative artistic importance of visual objects; visual properties (e.g., brightness, colors, etc.) of visual objects; motion characteristics (e.g., moving objects, stationary objects, background, etc.) of visual objects; past spatial locations of visual objects; past spatial directions of visual objects; etc.

By way of example but not limitation, the plurality of image layers may be generated from the multi-view unlayered image based on depths of visual objects depicted in the multi-view unlayered image. As illustrated in FIG. 1B, the 3D image space (196) of the multi-view unlayered image may be projected or superimposed into the 3D space (126) in relation to the (e.g., reference, actual, etc.) viewer (112-0) located at a (e.g., reference, etc.) spatial position 192 stationary in the 3D space (126). Depths of visual objects in the plurality of visual objects depicted in the multi-view unlayered image may be measured in relation to the reference spatial position (192) of the viewer (112-0) along a reference spatial direction of the viewer (112-0). This reference spatial direction of the viewer (112-0) may be determined as a frontal viewing direction of a wearable device used by the viewer (112-0)—which frontal viewing direction originates from the reference spatial position (192) of the viewer (112-0) toward the cinema display (104) and intercepts perpendicularly at the cinema display (104).

The cinema display (104) may be deployed as a stationary display in the 3D space (126), for example, to be viewed by a single viewer or multiple viewers. The device display (116) may be a specific display among individual displays of individual wearable device used by viewers including the viewer (112-0), and may not necessarily be stationary in the 3D space (126).

Under techniques as described herein, both the device display (116) of the wearable device used by the viewer (112-0) and the cinema display (104) that is shared among viewers are used to render the single-layer images in the plurality of image layers generated from the multi-view unlayered image to the viewer (112-0).

As illustrated in FIG. 1B, the layered image encoder can use a layer-separation surface 194 to partition a first proper subset of visual objects (e.g., 118, etc.) that are at or behind the layer-separation surface (194) relative to the viewer (112-0) into a cinema image layer. The cinema image layer comprises a plurality of first multi-view single-layer images generated from image portions, in the plurality of unlayered view images of the multi-view unlayered image, that depict the first proper subset of visual objects (e.g., 118, etc.).

Further, the layered image encoder can use the layer-separation surface (194) to partition one or more second proper subsets of visual objects (e.g., 120, etc.) that are before the layer-separation surface (194) relative to the viewer (112-0) into one or more device image layers. Each second proper subset in the one or more second proper subsets of visual objects (e.g., 120, etc.) corresponds to a respective device image layer in the one or more device image layers. The respective image layer comprises a respective plurality of second multi-view single-layer images generated from respective image portions, in the plurality of unlayered view images of the multi-view unlayered image, that depict each such second proper subset of visual objects (e.g., 118, etc.). Thus, the one or more device image layers comprise one or more pluralities of second multi-view single-layer images generated from image portions, in the plurality of unlayered view images of the multi-view unlayered image, that depict the one or more second proper subset of visual objects (e.g., 118, etc.).

In addition to one layer-separation surface such as 194 as illustrated in FIG. 1B, in some embodiments, zero or more additional layer-separation surfaces may be used to partition the one or more device image layers from one another. For example, additional layer-separation surfaces may be used to separate or distinguish one subset from another subset among the one or more second proper subsets of visual objects (e.g., 120, etc.) in cases there are multiple second proper subsets of visual objects. In some embodiments, a visual object (e.g., a 3D object, etc.)

may span more than one image layer. For example, a visual object such as a car may have a portion of the visual object such as the front portion of the car in a first device image layer, and other portions of the visual object such as the back portion of the car in one or more second device image layers. Additionally, optionally or alternatively, a visual object as described herein may span over the cinema image layer and one or more of the device image layers.

Figure 1C:
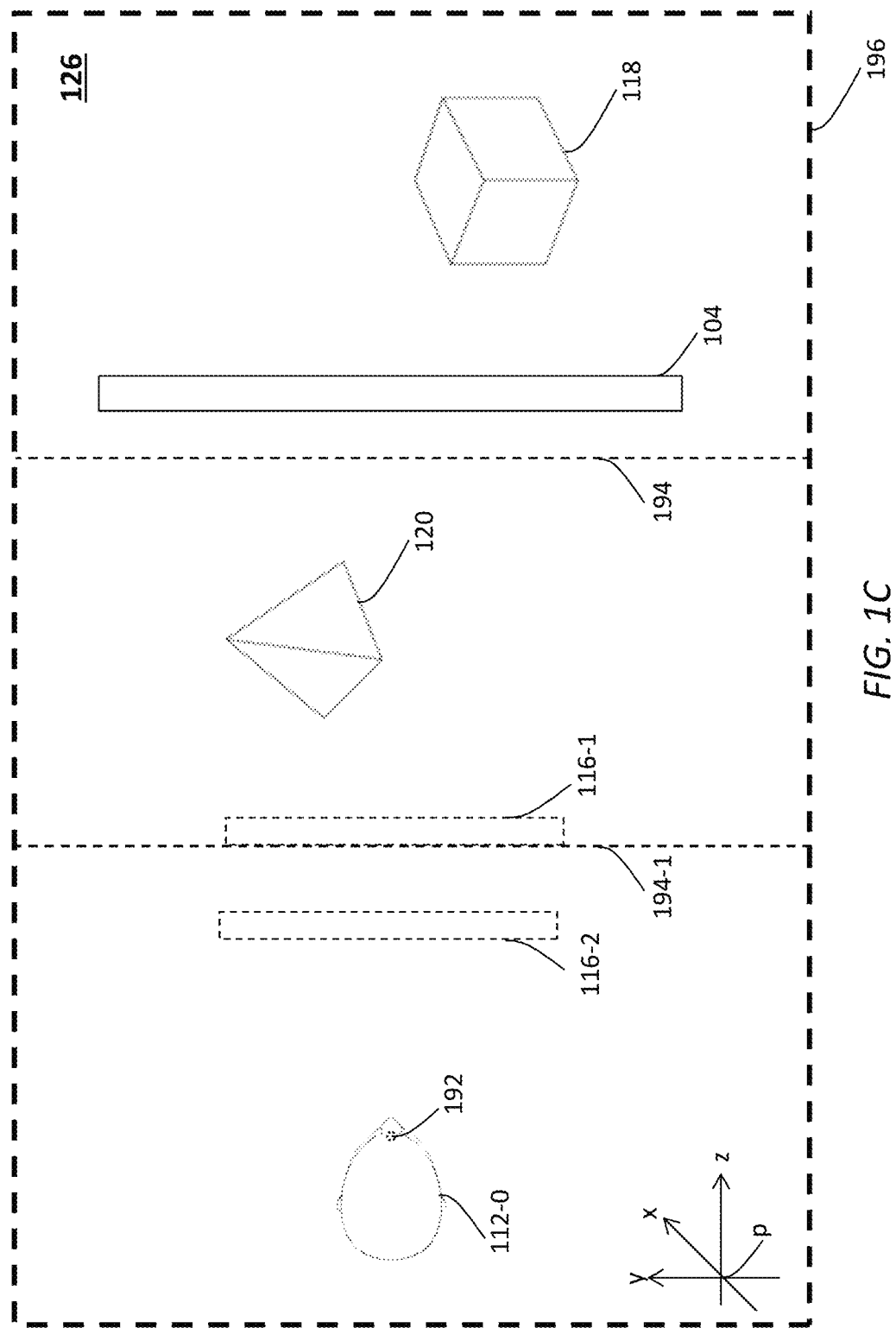

As illustrated in FIG. 1C, the wearable device used by the viewer (112-0) may comprise one or more device displays 116-1, 116-2, etc., (or a single device display with different image plane depths) from the reference spatial position (192) of the viewer (112-0). Single-layer images in the cinema image layer as partitioned by the layer-separation surface (194) may be used to generate cinema display images rendered/displayed at the cinema display (104). Single-layer images in one of the one or more device image layers as further partitioned by the layer-separation surface (194-1) may be used to generate device display images rendered/displayed at the device display (116-1). Single-layer images in the remainder of the one or more device image layers may be used to generate additional display images rendered/displayed at the device display (116-2). The display images rendered/displayed at the different image plane depths may be rendered simultaneously or rendered time-sequentially in a single image refresh time or a single image frame interval using time-division multiplexing.

Examples of layer-separation surfaces as described herein may include, but are not necessarily limited to only, any of: planes, curved surfaces, regular shapes, irregular shapes, etc.

Figure 1D:
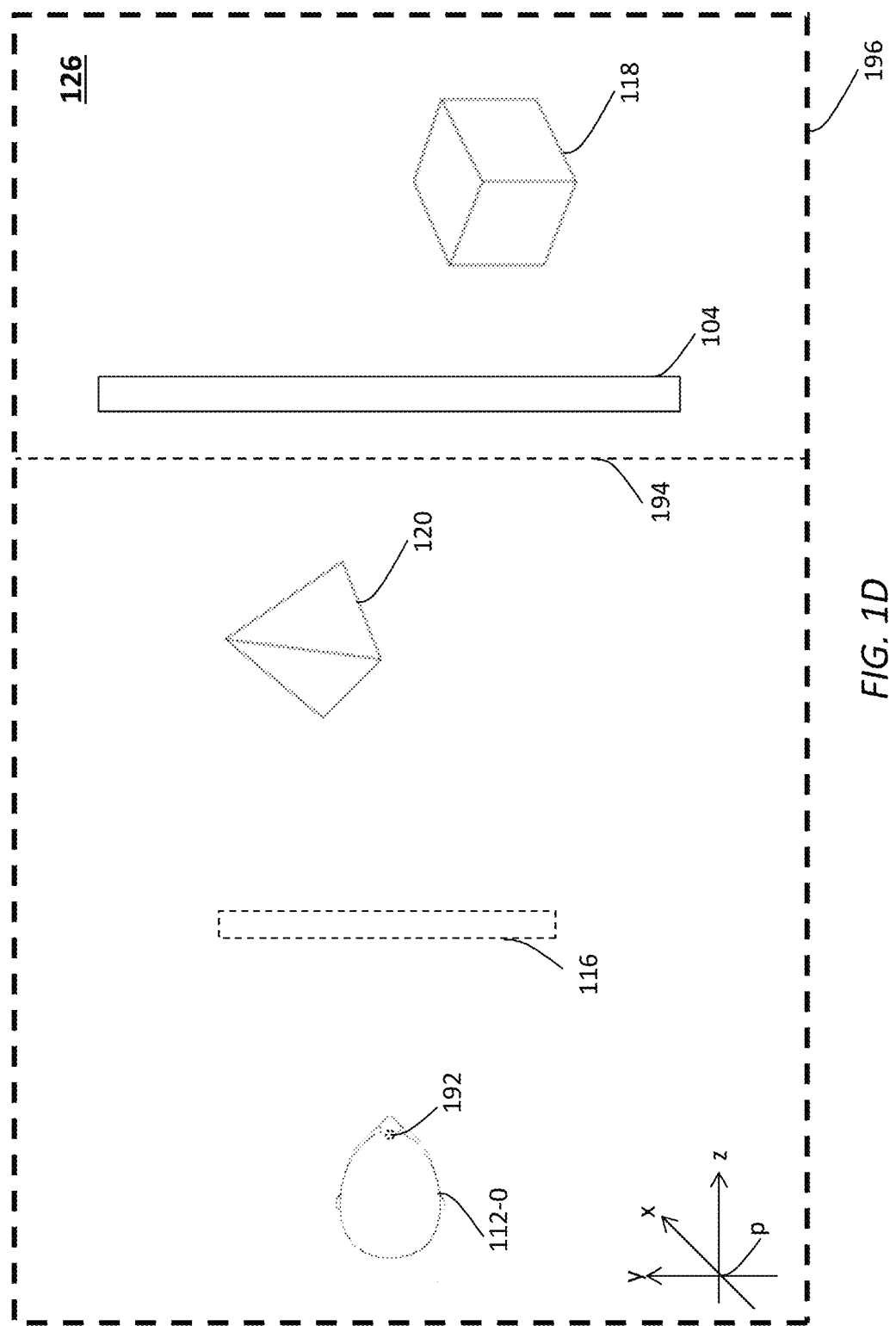
Figure 1F:
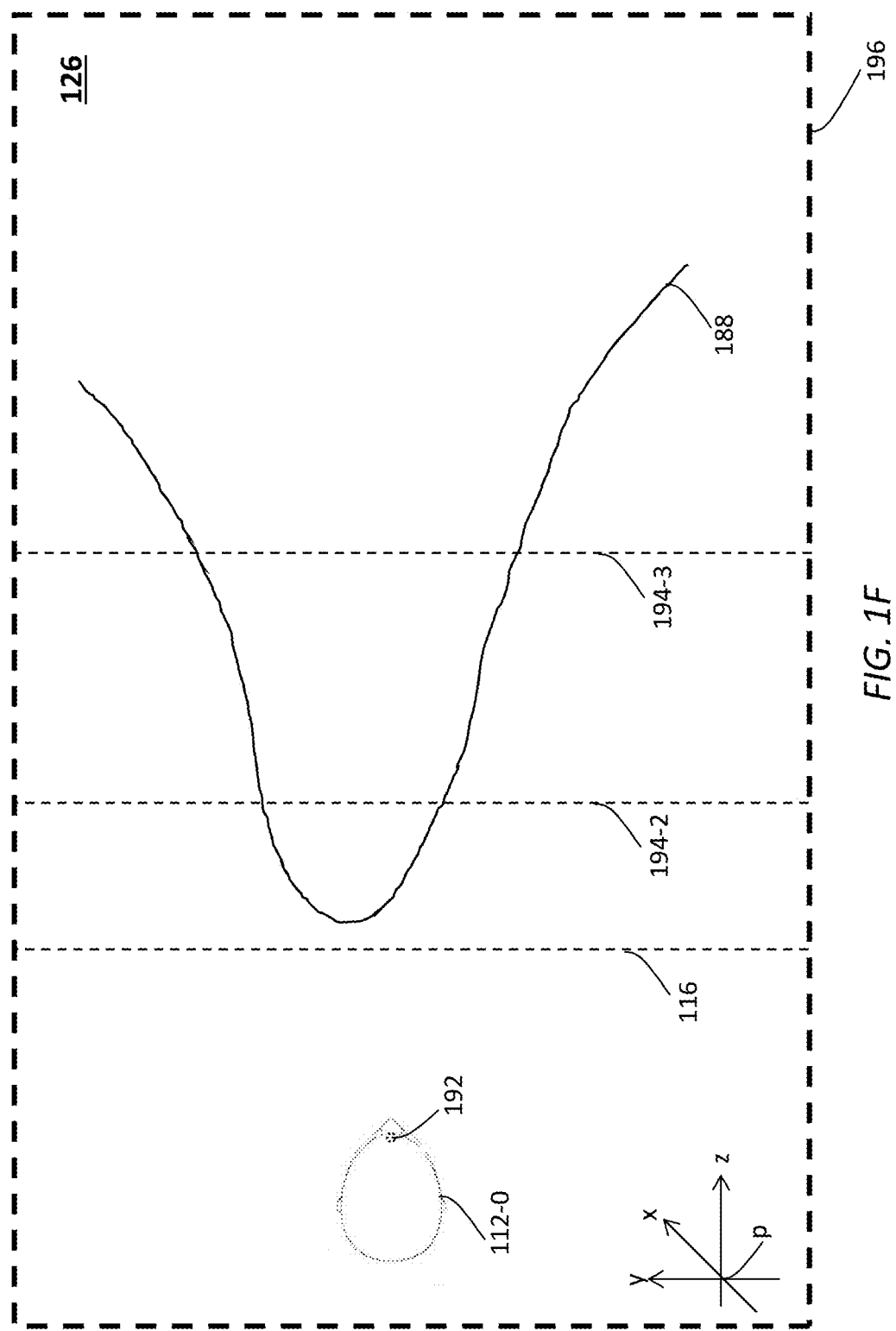
FIG. 1F illustrates an example 3D pixel distribution derived from a tensor map.

In some embodiments, a spatial position of the layer-separation surface (194) is set in relation to the cinema display (104). In an example, the layer-separation surface (194) may coincide with the cinema display (104). In another example, the layer-separation surface (194) may be set at a specific distance either behind (as illustrated in FIG. 1B) or in front of (as illustrated in FIG. 1D) the cinema display (104). The specific distance of the layer-separation surface (194) to the cinema display (104) may be, without limitation, one of: a relatively small distance, a relatively large distance, zero distance, a meter away, five meters away, a fraction of depth or distance between the cinema display (104) and the spatial position (192) of the viewer (112-0), etc. Thus, the specific distance of the layer-separation surface (194) to the cinema display (104) may represent a distance threshold (or a relative depth threshold) used to separate visual objects in the plurality of visual objects depicted in the multi-view unlayered image into different image layers.

In some embodiments, a spatial position of the layer-separation surface (194) is set in relation to the viewer (112-0) at the (reference) spatial position (192). For example, the layer-separation surface (194) may be set at a specific distance from the viewer (112-0). The specific distance of the layer-separation surface (194) to the viewer (112-0) may be, without limitation, one of: a relatively small distance, a relatively large distance, five meters away, 20 meters away, 50 meters away, etc. Thus, the specific distance of the layer-separation surface (194) to the viewer (112-0) may represent a distance threshold (or a relative depth threshold) used to separate visual objects in the plurality of visual objects depicted in the multi-view unlayered image into different image layers.

In some embodiments, a spatial position of the layer-separation surface (194) is set in relation to another spatial location other than those of the viewer (112-0) at the (reference) spatial position (192) and the cinema display (104). For example, the layer-separation surface (194) may be set at a specific distance from the origin "p" of the reference coordinate system. The specific distance of the layer-separation surface (194) to the origin "p" may be, without limitation, one of: a relatively small distance, a relatively large distance, zero distance, a meter away, five meters away, 20 meters away, 50 meters away, etc. Thus, the specific distance of the layer-separation surface (194) to the origin "p" may represent a distance threshold (or a relative depth threshold) used to separate visual objects in the plurality of visual objects depicted in the multi-view unlayered image into different image layers.

In some embodiments, as illustrated in FIG. 1E, the layered image encoder can partition the plurality of visual objects in the multi-view unlayered image into image layers based on spatial relationships in reference to entities physically or virtually present in the 3D space (126), without using a layer-separation surface (e.g., 194 of FIG. 1B or FIG. 1C, etc.).

For example, the plurality of visual objects (e.g., 118, 120, etc.) can be partitioned based on whether these visual objects respectively meet certain spatial relationship thresholds (or criteria) that are related to one or more of: the cinema display (104), the viewer (112-0) at the (reference) spatial location (192), the origin "p" of the reference coordinate system, etc., as shown in FIG. 1B.

A first proper subset of visual objects (e.g., 118, etc.) that meet specific spatial relationship thresholds (or criteria) relative to the cinema display (104) may be partitioned into a cinema image layer. One or more second proper subsets of visual objects (e.g., 120, etc.) that do not meet the specific spatial relationship thresholds (or criteria) relative to the cinema display (104) are partitioned into one or more device image layers. The specific spatial relationship thresholds (or criteria) relative to the cinema display (104) may comprise further spatial relationship thresholds (or criteria) that can be used to partition the one or more device image layers from one another. For example, the further spatial relationship thresholds (or criteria) may be used to separate or distinguish one subset from another subset among the one or more second proper subsets of visual objects (e.g., 120, etc.).

In some embodiments, the spatial relationship thresholds may comprise a specific depth threshold (e.g., no more than one meter, no more than two meters, no more than a spatial dimension value set as a relative value to a spatial dimension of the cinema display (104), etc.). The depth threshold specifies that all visual objects behind a specific depth from the cinema display (104) are to be partitioned into the cinema image layer. The depth threshold specifies that all other visual objects in front of the specific depth from the cinema display (104) are to be partitioned into the one or more device image layers. The depth threshold may be represented by a positive value, zero, or a negative value, of the specific distance to the cinema display (104).

Additionally, optionally or alternatively, a different spatial threshold such as a spatial parallax threshold, a spatial disparity threshold, etc., may be used instead of or in addition to the depth threshold for the purpose of selecting or partitioning the plurality of visual objects depicted in the multi-view unlayered image into different image layers.

For example, the cinema display (104) may represent a zero-parallax plane/surface in image rendering operations. Any visual objects that would be depicted with single-layer images rendered on the cinema display (104) as behind the cinema display (104) would be of positive parallaxes, whereas any visual objects that would be depicted with single-layer images rendered on the cinema display (104) as in front of the cinema display (104) would be of negative parallaxes.

In some embodiments, the spatial relationship thresholds may comprise a specific parallax threshold. The parallax threshold specifies that all visual objects no less than a specific parallax relative to the zero-parallax plane/surface as represented by the cinema display (104) are to be partitioned into the cinema image layer. The parallax threshold specifies that all visual objects less than the specific parallax relative to the zero-parallax plane/surface as represented by the cinema display (104) are to be partitioned into the one or more device image layers. The parallax threshold may be represented by a positive value, zero, or a negative value, of the specific parallax.

Additionally, optionally or alternatively, the cinema display (104) may represent a zero-disparity plane/surface in image rendering operations. Any visual objects that would be depicted with single-layer images rendered on the cinema display (104) as behind the cinema display (104) would be of positive disparity, whereas any visual objects that would be depicted with single-layer images rendered on the cinema display (104) as in front of the cinema display (104) would be of negative disparity.

In some embodiments, the spatial relationship thresholds may comprise a specific disparity threshold. The disparity threshold specifies that all visual objects no less than a specific disparity relative to the zero-disparity plane/surface as represented by the cinema display (104) are to be partitioned into the cinema image layer. The disparity threshold specifies that all visual objects less than the specific disparity relative to the zero-disparity plane/surface as represented by the cinema display (104) are to be partitioned into the one or more device image layers. The disparity threshold may be represented by a positive value, zero, or a negative value, of the specific disparity.

In some embodiments, the multi-view unlayered image may be a specific multi-view unlayered image in a plurality of multi-view unlayered images that constitute a time sequence of such images. The time sequence of multi-view unlayered images may represent a media program, a broadcast program, a movie, a VR session, an AR session, a remote presence session, a computer game, etc.).

In some embodiments, some or all of past and/or future spatial locations of visual objects, past and/or future spatial directions of the visual objects, past and/or future motion characteristics of the visual objects, past and/or future memberships of the visual objects in specific image layers, etc., may be used to determine whether any of these visual objects should be partitioned into a specific image layer in the plurality of image layers.

For example, a visual object may be previously determined to be in one image layer, and subsequently move to spatial locations, spatial directions, etc., that would correspond to a different image layer. To reduce thrashing in which the visual object dances too fast or too frequently between or among different image layers in a relatively short period of time, one or more of: delay effects/mechanisms, dampening factors, smoothening filters, noise processing, etc., may be implemented by the layered image encoder to allow or assign the visual object to remain in a particular image layer such as a previous image layer, a current image layer, etc., instead of immediately being partitioned or assigned to the current image layer, a new image layer, etc. Any of these delay effects/mechanisms, dampening factors, smoothening filters, noise processing, etc., may operate in dependence on some or all of: past and/or future spatial locations of visual objects, past and/or future spatial directions of the visual objects, past and/or future motion characteristics of the visual objects, past and/or future memberships/assignments of the visual objects in specific image layers, etc.

Additionally, optionally or alternatively, relative artistic importance of visual objects, visual properties (e.g., brightness, colors, etc.) of visual objects, motion characteristics (e.g., moving objects, stationary objects, background, etc.) of visual objects, etc., may also be used as selection factors, spatial relationship thresholds, spatial relationship criteria, etc., instead of or in addition to the foregoing selection factors, the foregoing spatial relationship thresholds, the foregoing spatial relationship criteria, etc., as discussed above.

In some embodiments, the layered image encoder may encode the plurality of image layers with their respective single-layer images into a multi-layer multi-view image. The multi-layer multi-view image, along with other multi-layer multi-view image generated from other multi-view unlayered images, may be encoded into a multi-layer multi-view video signal that is directly or indirectly transmitted to one or more downstream devices. Example downstream devices may include, but are not necessarily limited to only, any of: augmented entertainment systems for rendering the multi-view image in a multi-layer representation, storage devices for storing the multi-view image in the multi-layer representation, media streaming servers for streaming the multi-view image in the multi-layer representation, etc.

4. Tensor Map

As previously noted, a multi-view unlayered image may comprise a plurality of unlayered (single) view images that corresponds to a plurality of different views (e.g., viewing directions, fields of views, etc.). In some embodiments, based on depth information for each unlayered view image in the multi-view unlayered image, a tensor map (e.g., of order 3, in the x, y, z dimensions/coordinates/axes, etc.) may be constructed to generate a pixel distribution of the unlayered view image in the multi-view unlayered image in the 3D image space. A pixel in the pixel distribution generated from the tensor map is represented not only in the x and y dimensions/coordinates/axes (e.g., columns of an image frame, row of the image frame, etc.) but also in the z dimension/coordinate/axis (e.g., depth, etc.).

FIG. IF illustrates an example 3D pixel distribution 188 of an unlayered view image in a multi-view unlayered image that is derived from a tensor map. FIG. 1G illustrates example single-layer images 176-1 through 176-3 generated from the unlayered view image based on the 3D pixel distribution (188).

The tensor map may be constructed in a 3D image space (e.g., 196, etc.) depicted in the multi-view unlayered image based on (a) a 2D pixel distribution in the x and y dimensions/coordinates/axes as represented in the unlayered view image and (b) depth information that indicates (e.g., accurately, approximately, etc.) the z dimension/axis of each pixel in the distribution. Based on the tensor map, the 2D pixel distribution in the unlayered view image can now be represented as the 3D pixel distribution (188) in the 3D image space (196).

With the 3D pixel distribution (188) of the multi-view unlayered image, single-layer images may be generated, for example, with layer-separation surfaces. By way of example but not limitation, two layer-separation surfaces 194-2 and 194-3 may be placed in the 3D image space (196) to separate pixels of the 3D pixel distribution (188) into three single-layer images (176-1 through 176-3) in three different image layers.

As illustrated in FIG. 1G, a first 3D pixel distribution 188-1 of the 3D pixel distribution (188), which may include all the pixels with depths from the viewer at the reference spatial position (192) to the first layer-separation surface (194-2) along the depth or z direction (the viewer's frontal viewing direction), is projected into the first single-layer image (176-1) that is to be rendered with a device display of a wearable device at a first depth (e.g., a depth corresponding to an image plane supported by the device display of the wearable device, etc.) from a viewer at the reference spatial location (192). 3D pixels in the first 3D pixel distribution (188-1) may be projected onto 2D pixels (e.g., 178-1, 178-2, etc.) of the first single-layer image (176-1) based on the x and y dimensions/coordinates/axes of the 3D pixels in the first 3D pixel distribution (188-1).

A second 3D pixel distribution 188-2 of the 3D pixel distribution (188), which may include all the pixels with depths from the first layer-separation surface (194-2) to the second layer-separation surface (194-3) along the depth or z direction, is projected into the second single-layer image (176-2) that is to be rendered with the device display of the wearable device at a second depth (e.g., a depth corresponding to the first layer-separation surface (194-2) from the viewer at the reference spatial location (192). 3D pixels in the second 3D pixel distribution (188-2) may be projected onto 2D pixels (e.g., 178-3, 178-4, etc.) of the second single-layer image (176-2) based on the x and y dimensions/coordinates/axes of the 3D pixels in the second 3D pixel distribution (188-2).

A third 3D pixel distribution 188-3 of the 3D pixel distribution (188), which may include all the pixels with depths behind the second layer-separation surface (194-3) along the depth or z direction, is projected into the third single-layer image (176-3) that is to be rendered with the cinema display at a third depth (e.g., a depth corresponding to the cinema display from the viewer at the reference spatial location (192). 3D pixels in the third 3D pixel distribution (188-3) may be projected onto 2D pixels (e.g., 178-5, 178-6, etc.) of the third single-layer image (176-3) based on the x and y dimensions/coordinates/axes of the 3D pixels in the third 3D pixel distribution (188-3).

Image layer generation techniques based on tensor maps may be applied to each view image in the plurality of view images in the multi-view unlayered image to generate single-layer images for each such view image, respectively. Thus, single-layer images in a plurality of image layers may be generated from the multi-view unlayered image using these image layer generation techniques.

When the single-layer images are provided to an image renderer in an augmented entertainment system for rendering with a wearable device of a viewer, the single-layer images can be spatially transformed based on the actual spatial position and the actual spatial direction of the wearable device by translation, rotation, scaling, etc. For example, the first single-layer image (176-1) (or a cinema image layer) may be rendered on a cinema display, whereas the second and third single-layer images (176-2 and 176-3) (or device image layers) may be rendered with a device display of a wearable display.

A relatively distant viewer may see the first single-layer image (176-1) as a relatively small image inversely proportional to the distance between the relatively distant viewer and the cinema display; thus, the second and third single-layer images may be scaled proportionally to match the sizes or aspect ratios of the first single-layer image (176-1) as being viewed by the relatively distant viewer. Further, since the relatively distant viewer may be located further back from a viewer at a reference spatial location (e.g., 192, etc.), the second and third single-layer images or visual objects therein may be spatially translated based at least in part on the distance between the relatively distant viewer and a viewer at the reference spatial location (192). If a spatial direction of the wearable device of the relatively distant viewer does not match with the frontal viewing direction of a viewer at the reference spatial location (192) used to generate image layers and single-layer images, the second and third single-layer images or visual objects therein may be spatially rotated based at least in part on the angle or angular distance between the spatial direction of the wearable device of the relatively distant viewer and the frontal viewing direction of the viewer at the reference spatial location (192). Likewise, for a relatively near viewer, spatial transformations such as translations, rotations, scaling, etc., can be similarly applied to single-layer images based on spatial positions and/or spatial directions of the relatively near viewer.

Figure 1H:
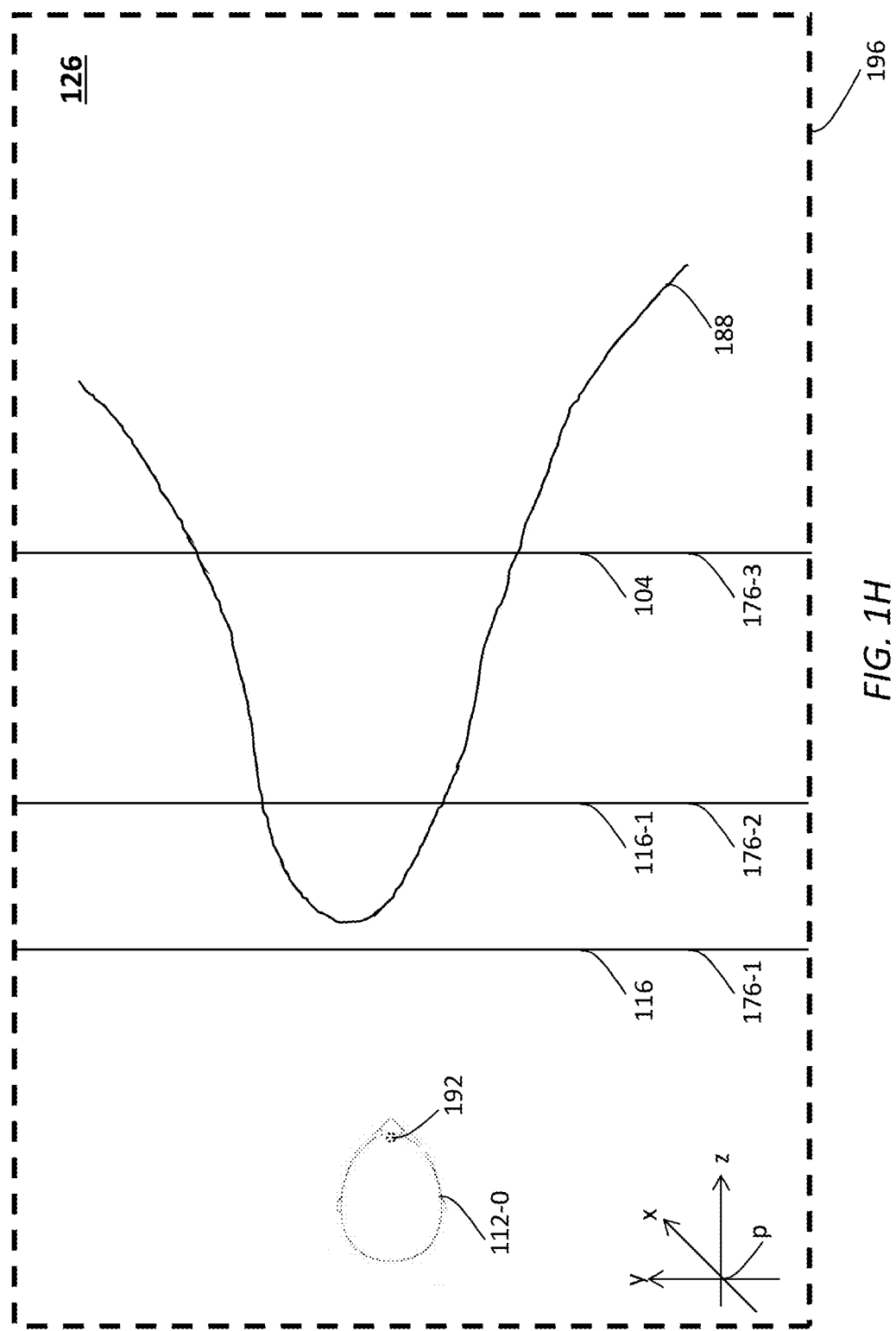
FIG. 1H illustrates a tensor map reconstructed in image rendering operations.

In some embodiments, tensor maps can also be used in image rendering operations, as illustrated in FIG. 1H. For example, cinema display images, as generated from the single-layer images in the cinema image layer and rendered on the cinema display (104), may be used to reproduce a portion of a tensor map (or a pixel distribution) that corresponds to a portion of the 3D image space (196) in the 3D physical space (126) in which the viewer is located at a spatial location that may be the same as or may be different from the reference spatial location (192). Device display images, as generated from the single-layer images in the one or more device image layers and rendered with the device display at one or more image planes (e.g., 116, 116-1, etc.) may be used to reproduce other portions of the tensor map (or the pixel distribution) that correspond to remaining portions of the 3D image space (196) in the 3D physical space (126).

The device display images may be generated individually for a wearable device based on spatial transformations (e.g., translations, rotations, scaling, etc.) dependent on a specific spatial position and/or a specific spatial direction of the wearable device, with constraints that other portions of the tensor map (or the pixel distribution) reproduced from the device display images seamlessly adjoining with the portion of the same tensor map (or the pixel distribution) reproduced from the cinema display images. Additionally, optionally, optionally, some or all of image processing operations such as interpolation, sharpening, blurring, disocclusion, etc., may be performed in image rendering operations under techniques as described herein. Thus, a 3D image space as rendered by the combination of the cinema display images and the device display images accurately or faithfully reproduce the 3D pixel distribution (188) in the 3D image space (196) as originally depicted in the multi-view unlayered image.

5. Layered Image Encoder and Augmented Entertainment System

Figure 2A:
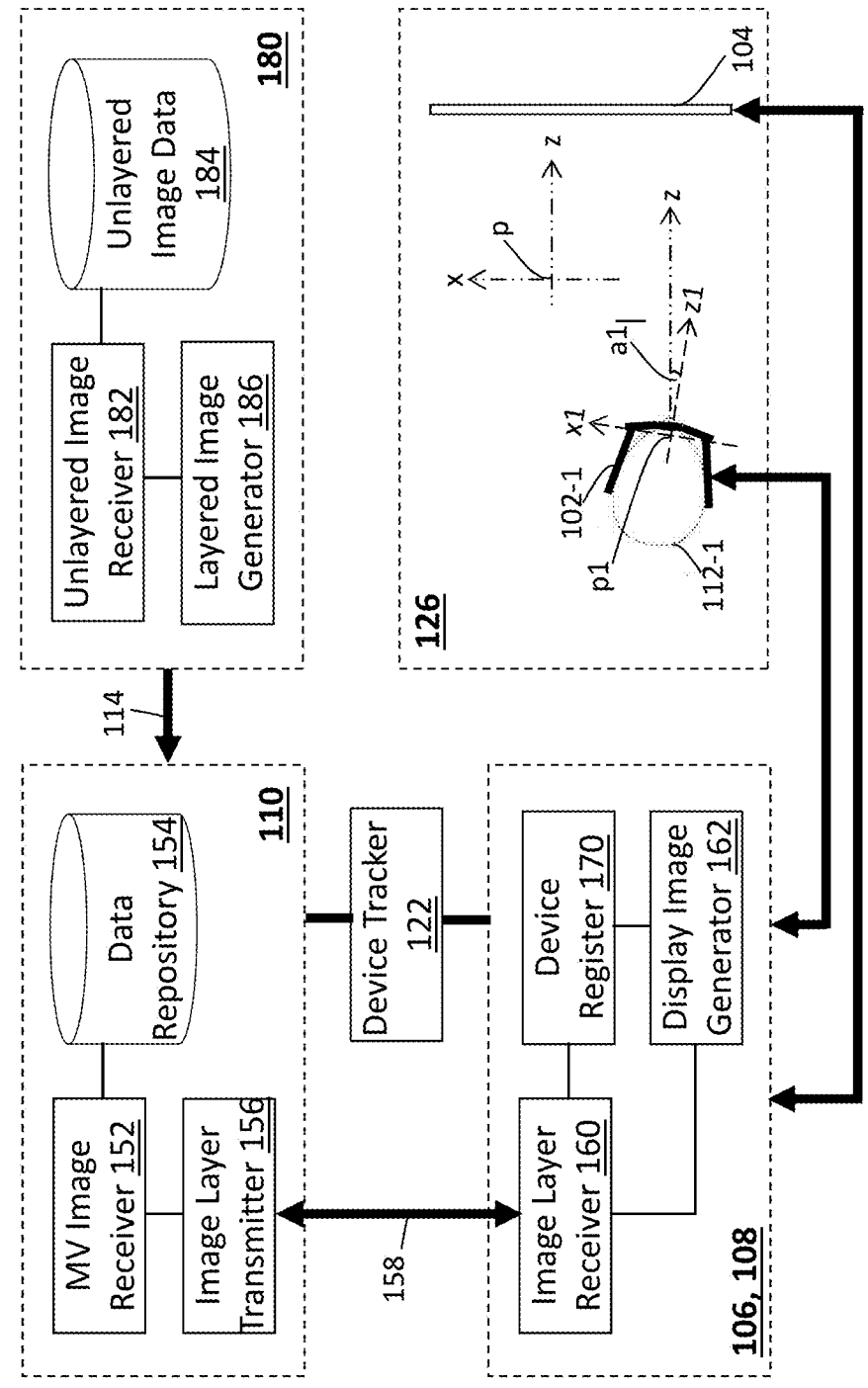
FIG. 2A through FIG. 2C illustrate example configurations of an augmented entertainment system.

FIG. 2A illustrates an example configuration 100 of an augmented entertainment system that comprises a layered image encoder 180, an image content receiver 110, image renderers (e.g., 106, 108, etc.), a device tracker 122, one or more wearable devices such as a wearable image rendering device 102-1 of a viewer 112-1, etc., in a 3D space (e.g., 126, etc.).

Some or all of the components/devices as depicted in FIG. 2A may be implemented by one or more mechanical components, one or more electrooptical components, one or more computing devices, modules, units, etc., in software, hardware, a combination of software and hardware, etc. Some or all of the components/devices as depicted in FIG. 2A may be communicatively (e.g., wirelessly, with wired connections, etc.) coupled with some other components/devices as depicted in FIG. 2A or with other components/devices not depicted in FIG. 2A.

In some embodiments, the layered image encoder (180) comprises an unlayered image receiver 182, a layered image generator 186, an unlayered image data store 184, etc.

In some embodiments, the unlayered image receiver (182) comprises software, hardware, a combination of software and hardware, etc., configured to receive multi-view unlayered images, for example in an unlayered image video signal or in stored unlayered image data, from an unlayered image source such as the unlayered image data store (184), a cloud-based image source, a camera system in connection with a VR application, an AR application, a remote presence application, a display application, etc.

In some embodiments, the layered image generator (186) comprises software, hardware, a combination of software and hardware, etc., configured to access spatial information that describes spatial locations of each visual object in a plurality of visual objects in a 3D image space (e.g., 196 of FIG. 1A, etc.) as depicted in each of the multi-view unlayered images.

Based on the spatial information that describes the spatial locations of the plurality of visual objects in the 3D image space (196 of FIG. 1A) in each of the multi-view unlayered images, the layered image generator (186) generates single-layer images in a plurality of image layers from each such multi-view unlayered image. Thus, each image layer in the plurality of image layers comprises multi-view single-layer images from all the multi-view unlayered images.

In a non-limiting example, a first image layer in the plurality of image layers may be used as a cinema image layer by downstream recipient devices, where other image layers in the plurality of image layers may be used as device image layers by the downstream recipient devices.

The layered image generator (186) encodes the multi-view single-layer images in the plurality of image layers generated from the multi-view unlayered images into image content 114, and provides/transmits the image content (114) to one or more downstream devices such as the input content receiver (110), data storage, cinema 3D systems, etc.

In some embodiments, the image content receiver (110) comprises a multi-view (MV) image receiver 152, an image layer transmitter 156, a data repository 154, etc.

In some embodiments, the multi-view image receiver (152) comprises software, hardware, a combination of software and hardware, etc., configured to receive the (input) image content (114) from an image source such as the layered image encoder (180), a cloud-based image source, a camera system in connection with a VR application, an AR application, a remote presence application, a display application, etc.; decode the input image stream (114) into a sequence of multi-layer multi-view images. Each multi-layer multi-view image comprises one or more single-layer cinema images in a cinema image layer and one or more single-layer device images in one or more device image layers, as decoded by the multi-view image receiver (152) from the multi-layer multi-view video signal.

From the cinema image layer, the image layer transmitter (156) identifies or generates the one or more single-layer cinema images. The one or more single-layer cinema images may depict a first proper subset of one or more visual objects (e.g., 118, etc.) in a plurality of visual objects (e.g., 118, 120, etc.) that were depicted in an (original) multi-view unlayered image from which the single-layer cinema and device images in the cinema image layer and the one or more device image layers were previously derived.

From the one or more device image layers, the image layer transmitter (156) identifies or generates one or more single-layer device images. The one or more single-layer device images may depict one or more second proper subsets of one or more visual objects (e.g., 120, etc.) in the plurality of visual objects (e.g., 118, 120, etc.) that were depicted by the (original) multi-view unlayered image.

In some embodiments, the image layer transmitter (156) sends or otherwise provides, via a data flow 158, all the single-layer cinema images to the image renderers (106, 108), or a cinema image renderer (e.g., 106, etc.) therein. Furthermore, the image layer transmitter (156) sends or otherwise provides, via the data flow (158), all the single-layer device images to the image renderers (106, 108), or a device image renderer (e.g., 108, etc.) therein.

The user (112-1) may move to cause changes in spatial positions and spatial directions of the wearable device (102-1) at runtime. In some embodiments, the device tracker (122) comprises software, hardware, a combination of software and hardware, etc., configured to track/monitor spatial positions and/or spatial directions of the wearable device (102-1); generate positional and directional data of the wearable device (102-1) based on the spatial positions and/or spatial directions of the wearable device (102-1); etc.

The positional and directional data of the wearable device (102-1) as generated by the device tracker (122) may be of a relatively fine time resolution (e.g., every millisecond, every five milliseconds, etc.), and may be used by other devices such as the image content receiver (110) and/or the image renderers (106, 108) to establish/determine the spatial positions and/or spatial directions of the wearable device (102-1) at a given time resolution (e.g., every millisecond, every five milliseconds, etc.).

Examples of device trackers as described herein may include but are not necessarily limited to only, any of: external device trackers, internal device trackers, outside-in device trackers, inside-out device trackers, etc. By way of example but not limitation, the device tracker (122) in the configuration (100) as illustrated in FIG. 2A represents an external device tracker. It should be noted, however, that in other embodiments, an inside-out device tracker, which may be a part of the wearable device (102-1), collocated with the wearable device (102-1), co-moving with the wearable device (102-1), etc., can also be used in addition to or instead of the (external) device tracker (122). The device tracker (122) can track spatial coordinates of a relatively large number of wearable devices including but not limited to the wearable device (102-1) that are present in the 3D space (126).

By way of illustration but not limitation, a stationary three-dimensional spatial coordinate system used to represent spatial positions in the 3D space (126) may be a reference Cartesian coordinate system. FIG. 2A depicts only two example spatial dimensions, namely an x-axis and a z-axis, of the reference Cartesian coordinate system; the reference Cartesian coordinate system may comprise another spatial dimension, namely a y-axis orthogonal to both the x and z axes, that points out from FIG. 2A. The reference Cartesian coordinate system may comprise a coordinate system origin at a reference spatial position denoted as "p" as shown in FIG. 2A. The reference spatial position may be selected from any spatial position stationary to the 3D space (126).

The wearable device (102-1) may, but is not necessarily limited to only, to be a rigid-body (or a fixed spatial shaped) device in operation. Spatial positions on the wearable device (102-1) can be represented in a three-dimensional spatial coordinate system stationary relative to the wearable device (102-1). The device-stationary Cartesian coordinate system in reference to the reference Cartesian coordinate system can be used to represent spatial positions and spatial directions on the wearable device (102-1). The device-stationary Cartesian coordinate system comprises three spatial dimensions represented by respective axes including an x1-axis and a z1-axis as shown in FIG. 2A, and a y1-axis orthogonal to both the x1 and z1 axes that is not depicted in FIG. 2A. The device-stationary Cartesian coordinate system may comprise a coordinate system origin at a device-stationary spatial position denoted as "p1" as shown in FIG. 2A. The device-stationary spatial position may be selected from any spatial position stationary to the wearable device (102-1). In some embodiments, if there is a spatial location that is a point of symmetry on the wearable device (102-1), then such spatial location may be selected as the device-stationary spatial position "p1" to serve as the coordinate origin to the device-stationary Cartesian coordinate system.

In some embodiments, the device tracker (122) repeatedly (e.g., in real time, in near real time, within a strict timing budget, every 1 millisecond, every 2 milliseconds, etc.) tracks or determines one or more spatial coordinates of the wearable device (102-1) at a given time point in the reference Cartesian coordinate system of the 3D space (126). In some embodiments, the one or more spatial coordinates of the wearable device (102-1) may be represented by one or more spatial coordinates of the device-stationary spatial position "p1" that is stationary to the wearable device (102-1) in relation to the reference Cartesian coordinate system of the 3D space (126).

Spatial coordinates of the device-stationary spatial location "p1" of the wearable device (102-1) constitutes a spatial trajectory of the wearable device (102-1) that may be represented as functions of time. Any combination of one or more motion characteristics of the wearable device (102-1) may be determined from these functions of time representing the spatial trajectory of the wearable device (102-1).

For example, linear positions/displacements (over time) of the wearable device (102-1) in relation to a reference point—such as the origin "p" of the reference Cartesian coordinate system—stationary in the 3D space (126) may be determined or derived (e.g., as a vector difference, etc.) from the spatial trajectory (represented by the functions of time as previously mentioned) of the wearable device (102-1). Additionally, optionally or alternatively, linear velocities, speeds, accelerations, etc., (over time) of the wearable device (102-1) in relation to the reference point stationary in the 3D space (126) may be determined or derived (e.g., as a first-order derivative, as a second-order derivative, etc.) from the spatial trajectory of the wearable device (102-1).

Similarly, angular positions/displacements (e.g., a1, etc.) (over time) of the wearable device (102-1) may be determined or derived from angular positions/displacements of the device-stationary coordinate system (e.g., x1, y1, z1, etc.) in relation to the reference Cartesian coordinate system (e.g., x, y, z, etc.).

Additionally, optionally or alternatively, linear or angular velocities, speeds, accelerations, etc., (over time) of the wearable device (102-1) in relation to the reference coordinate system in the 3D space (126) may be determined or derived (e.g., as a first-order derivative, as a second-order derivative, etc.) from the linear or angular positions/displacements (e.g., p1, a1, etc.) of the wearable device (102-1).

Figure 2B:
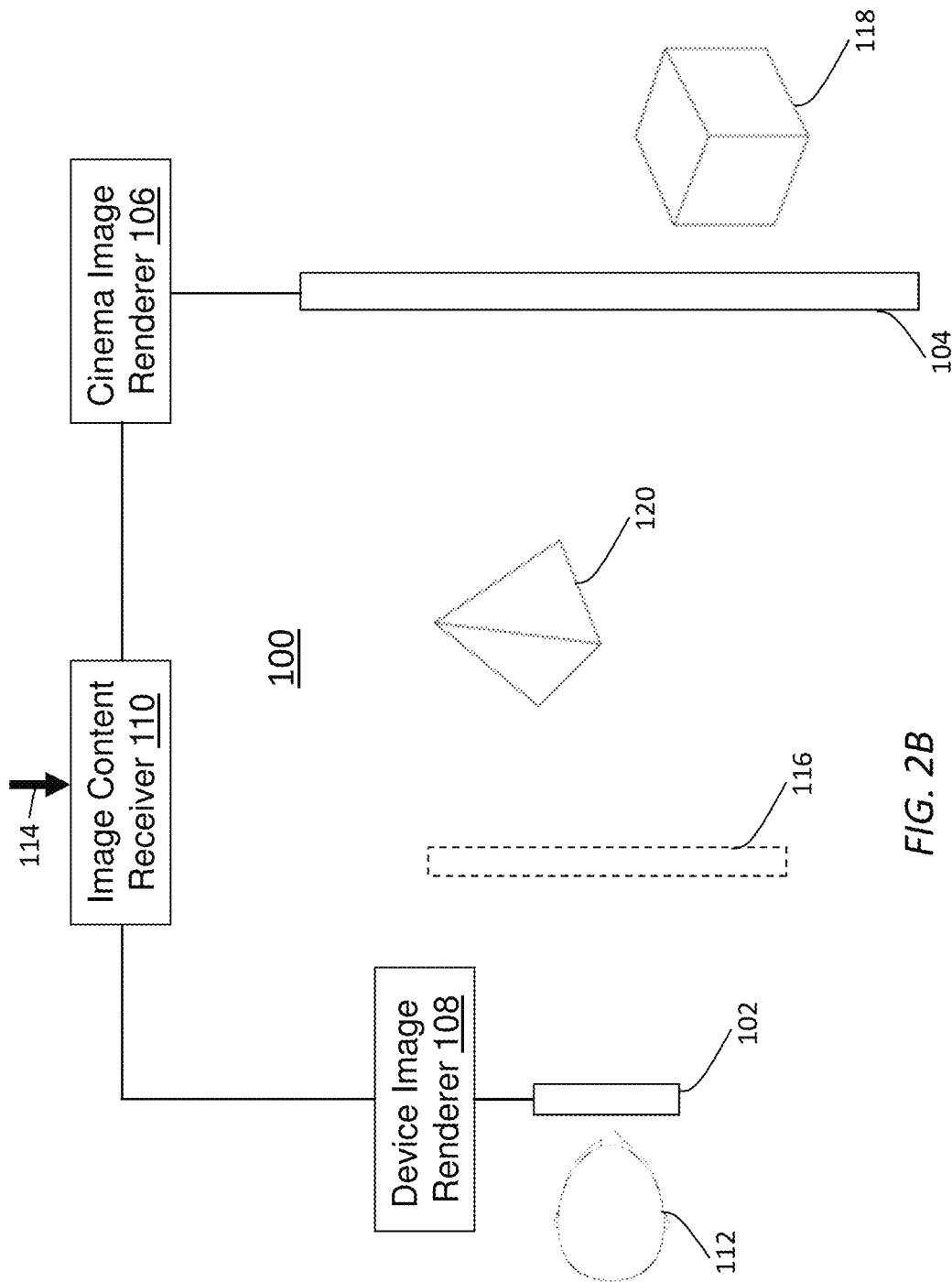
Figure 2C:
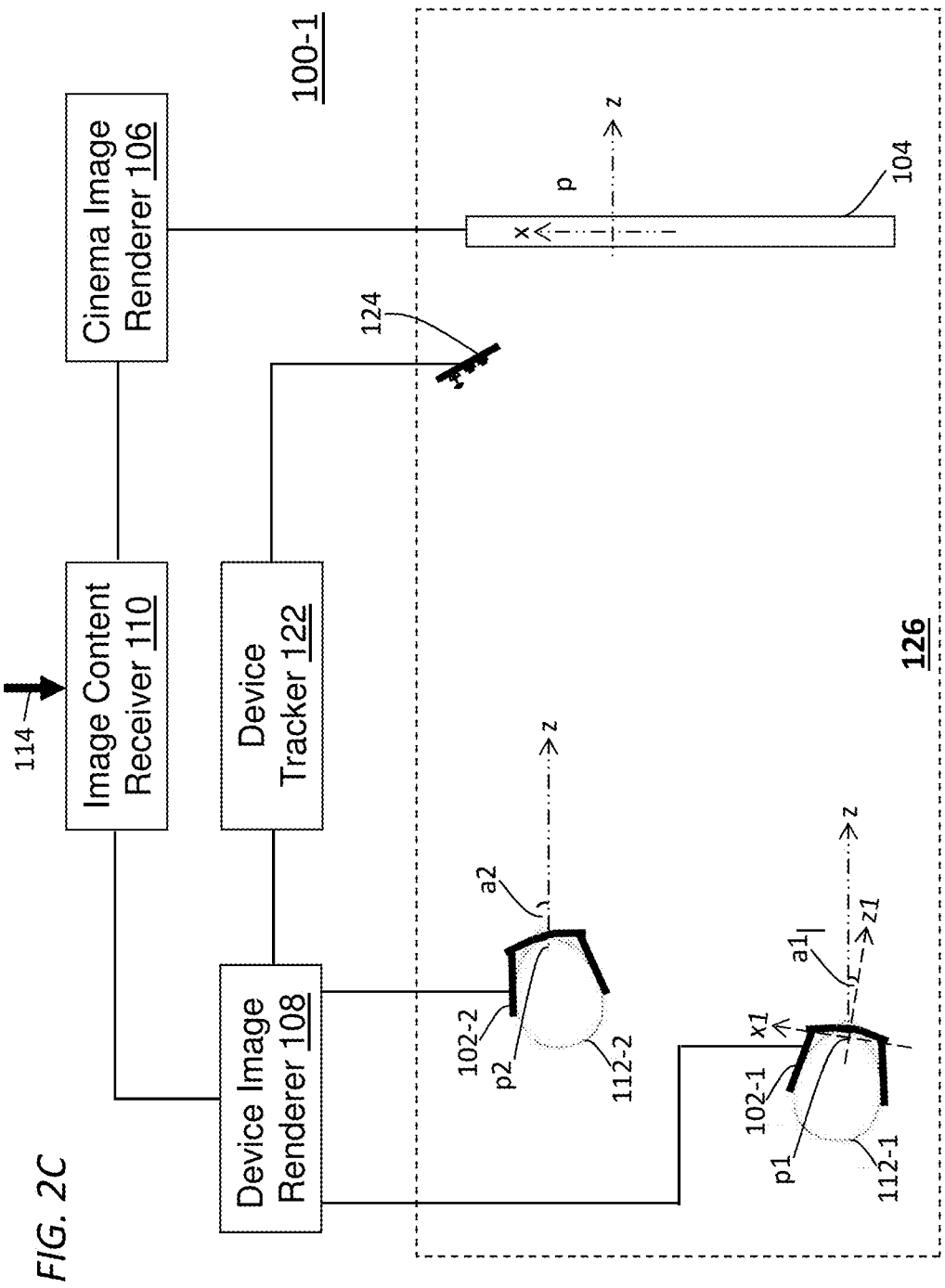

In some embodiments, the image renders (106, 108) may be implemented separately as a cinema image renderer (e.g., 106, etc.) and a device image renderer (e.g., 108) as illustrated in FIG. 2B and FIG. 2C. Additionally, optionally or alternatively, the image renderers such as the cinema image renderer (106), the device image renderer (108), etc., can be implemented collectively within a single device (e.g., cinema-wide server, etc.) as illustrated in FIG. 2A. Any individual image renderer in the image renderers (106, 108) such as the cinema image renderer (106), the device image renderer (108), etc., may be implemented in multiple (e.g., computer, device, virtual machine, etc.) instances working in parallel to support image rendering operations in real time in connection with a relatively large number of viewers concurrently in the 3D space (126).

By way of example but not limitation, the image renderers (106, 108) comprises an image layer receiver 160, a device register 170, a display image generator 162, etc. The image renderers (106, 108) may include, but are not necessarily limited to only, any of: a central image renderer, a distributed image renderer, an image renderer implemented as a part of a wearable device (e.g., 102-1, etc.), an image renderer external to some or all of the wearable devices (e.g., 102-1, etc.) in the 3D space (126), partly implemented as a part of a wearable device (e.g., 102-1, etc.) and partly implemented in a separate device external to the wearable device (102-1), etc.

In some embodiments, the image layer receiver (160) comprises software, hardware, a combination of software and hardware, etc., configured to receive, via the data flow (158), a cinema image layer and one or more device image layers for each multi-layer multi-view image in a sequence of multi-layer multi-view image.

In some embodiments, the device register (170) comprises software, hardware, a combination of software and hardware, etc., configured to receive device ID information (e.g., MAC addresses, network addresses, IP addresses, etc.) of wearable devices (e.g., 102-1, etc.) in the 3D space (126); register each of the wearable devices (e.g., 102-1, etc.) for receiving device display images to be rendered at the wearable devices (e.g., 102-1, etc.); etc.

Based on single-layer cinema images in the cinema image layer, the display image generator (162) generates one or more cinema display images; causes the one or more cinema display images to be rendered on the cinema display (104); etc.

In some embodiments, the image renderers (106, 108), or the display image generator (162) therein, receives positional and directional data of each of the wearable devices (e.g., 102-1, etc.) as tracked/monitored by the device tracker (122) in the 3D space (126); generates one or more respective device display images for each of the wearable devices (e.g., 102-1, etc.), based on single-layer device images in the one or more device image layers and the positional and directional data of each such wearable device (e.g., 102-1, etc.); causes the respective one or more device display images to be rendered with each such wearable device (e.g., 102-1, etc.) on a respective device display (e.g., 116 of FIG. 1B, etc.); etc. The image renderers (e.g., 106, 108, etc.) can communicate control information, status information, positional data, image data such as the device display images, metadata, etc., with wearable image rendering devices (e.g., 102-1, etc.) over one or more data connections. Example data connections may include, but are not limited, wireless data connections, wired data connections, radio-frequency based data connections, cellular data connections, Wi-Fi data connections, infrared-based data connections, data connections over HDMI cable, data connections over optical cable, data connections over High-Speed Serial Interface (HSSI), High-Definition Serial Digital Interface (HD-SDI), 12G-SDI, USB cable, and the like to seat/armrest/floor, etc.

Examples of cinema display images and/or device display images include, but are not necessarily limited to only, one of: a monoscopic image, a combination of a left view image and a right view image, a combination of two or more multi-view images, etc.

In operational scenarios in which an image layer comprises a plurality of different view single-layer images, the cinema image renderer (106) and/or the device image renderer (108) may identify, select, and/or interpolate a left view image and a right view image from among the plurality of different view single-layer images. For example, one or both of such left view image and right view image may be generated by image interpolating and/or image reconstruction that combines different view single-layer images into the left view image and/or the right view image.

In some embodiments, the image renderers (106, 108) perform display management operations as a part of rendering the cinema display images and/or device display images.

The augmented entertainment system may be used to support real time video applications, near-real-time video applications, non-real-time video applications, virtual reality (VR) applications, augmented reality (AR) applications, remote presence applications, automobile entertainment applications, helmet mounted display applications, heads up display applications, games, 2D display applications, 3D display applications, multi-view display applications, etc. Some or all of input image content data (114) can be received, generated or accessed by the augmented entertainment system in real time, in near real time, in non-real time, etc.

Techniques as described herein can be used to support rendering and viewing 3D or multi-view images with a wide variety of displays. Example displays (e.g., 104, a device display of a wearable device, etc.) may include, but are not necessarily limited to only, any of: a cinema display, a home theater display, a television, a projection-based display system, a backlight-based display system, a light field based display system, a light waveguide based display system, liquid crystal based display system, light emitting diode based system, organic light emitting diode based system, an image projector, an AR display, a HoloLens display, a Magic Leap display, a Mixed Reality (MR) display, a tensor display, a volumetric display, a light field (LF) display, an Immy display, a Meta display, a relatively simple pair of AR glasses, a display with any in a wide range of capabilities of overcoming the accommodation-vergence conflict, etc.

In some embodiments, instead of receiving multi-layer multi-view images comprising single-layer images in a plurality of image layers from an external image source such as the layered image encoder (180), the multi-view image receiver (152) can receive or retrieve these multi-view multi-layer images from the data repository (154), for example locally. The data repository (154) represents one or more databases, one or more data storage units/modules/devices, etc., configured to support operations such as storing, updating, retrieving, deleting, etc., with respect to some or all of the multi-layer multi-view images, etc.

In some embodiments, instead of directly sending image layers to image renderers (e.g., cinema image renderer, device image renderer, etc.), image sets comprising specifically selected single-layer images in the image layers may be sent to image renderers (e.g., 106, 108, etc.). The image layer transmitter (156) can receive, from an image renderer in the image renderers (106, 108) and/or from the device tracker (122), positional and directional data of the wearable device (102-1) as tracked/monitored by the device tracker (122); establish/determine spatial positions and/or spatial directions of a given wearable device (e.g., 102-1, etc.) over time in relation to the reference coordinate system; and generate one or more image sets by selecting specific single-layer images in the image layers of each received multi-layer multi-view image. The specific single-layer images can be specifically adapted for the wearable device (102-1) in accordance with the spatial positions and/or spatial directions of the wearable device (102-1). Further, the image layer transmitter (156) can encode the one or image sets into a video stream; provide/transmit, via the data flow (158), the video stream to the image renderer (106, 108); etc. The image sets may be used by the image renderers (106, 108) to generate the device display images for the wearable device (102-1) using image reconstructions/interpolations. Example image sets and image reconstructions/interpolations can be found in U.S. patent application Ser. No. 15/949,720, with an application title of "ADAPTING VIDEO IMAGES FOR WEARABLE DEVICES" by Ajit Ninan and Neil Mammen, filed on 10 Apr. 2018, the entire contents of which are hereby incorporated by reference as if fully set forth herein.

Techniques as described herein can be implemented in a variety of system architectures. Some or all image processing operations as described herein can be implemented by one or more of cloud-based video streaming servers, video streaming servers collocated with or incorporated into wearable devices, video streaming clients, image content receivers, image rendering devices, etc. Based on one or more factors such as types of video applications, bandwidth/bitrate budgets, computing capabilities, resources, loads, etc., of recipient devices, computing capabilities, resources, loads, etc., of video streaming servers, image content receivers, image rendering devices, underlying computer networks, etc., some image processing operations can be performed by an image content receiver, while some other image processing operations can be performed by an image rendering device, etc.

FIG. 2B illustrates another example configuration 100-1 of a (3D) augmented entertainment system that comprises a 3D image rendering viewing eyewear device such as a wearable device 102 with a device display 112, a cinema display 104, a cinema image renderer 106, a device image renderer 108, an image content receiver 110, etc. Some or all of the components/devices as depicted in FIG. 2B may be implemented by one or more mechanical components, one or more electrooptical components, one or more computing devices, modules, units, etc., in software, hardware, a combination of software and hardware, etc. Some or all of the components/devices as depicted in FIG. 2B may be communicatively (e.g., wirelessly, with wired connections, etc.) coupled with some other components/devices as depicted in FIG. 2B or with other components/devices not depicted in FIG. 2B.

In some embodiments, the image content receiver (110) sends or otherwise provides, the single-layer cinema images (as previously discussed in connection with FIG. 2A) decoded from the cinema image layer to the cinema image renderer (106). Furthermore, the image content receiver (110) sends or otherwise provides the single-layer device images (as previously discussed in connection with FIG. 2A) decoded from the device image layers to the device image renderer (108).

Based on the single-layer cinema images, the cinema image renderer (106) renders, cinema display images on the cinema display (104), which may be one of: a first monoscopic image, a combination of a first left view image and a first right view image, a combination of two or more first multi-view images, etc.

Based on the single-layer device images, the device image renderer (108) cause the wearable device (102) to render device display images, on a device display 116, which may be one of: a second monoscopic image, a combination of a second left view image and a second right view image, a combination of two or more second multi-view images, etc.

In some embodiments, the device display (116) is not a physical display but rather an image plane or a virtual display created by light rays emitted by imager(s) in the wearable device (102).

In some embodiments, the first proper subset of visual objects (e.g., 118, etc.) as depicted in a pair of a left view cinema display image and a right view cinema display image rendered on the cinema display (104) and the one or more second proper subsets of visual objects (e.g., 120, etc.) as depicted in corresponding device display images rendered on the device display (116) are simultaneously (e.g., concurrently, synchronously, within the same image frame interval, etc.) rendered to collectively depict a plurality of visual objects (e.g., 118, 120, etc.) located at different spatial locations in a 3D image space (e.g., 196 of FIG. 1A, etc.). These spatial locations in the 3D image space (196) may be the same as those specified or described in spatial information of a multi-view unlayered image that was used to partition the plurality of visual objects into the cinema image layer (or the first proper subset of visual objects) and the one or more device image layers (or the one or more second proper subsets of visual objects) in the first place.

In some embodiments, the cinema image renderer (106) and/or the device image renderer (108) performs display management operations as a part of rendering (a) the left view cinema display image and the right view cinema display image and/or (b) the device display images.

In operational scenarios in which an augmented entertainment system as described herein operates in a multi-viewer environment, spatial positions (including but not limited to individual seat positions of multiple users) and/or spatial directions of individual wearable devices of the multiple users, can be tracked, calculated and/or used to seamlessly overlay (or superimpose) individual device image content rendered with the individual wearable devices of the viewers with big screen content (or cinema image content) rendered on a shared display such as a cinema display, a projection display, etc.

Figure 3A:
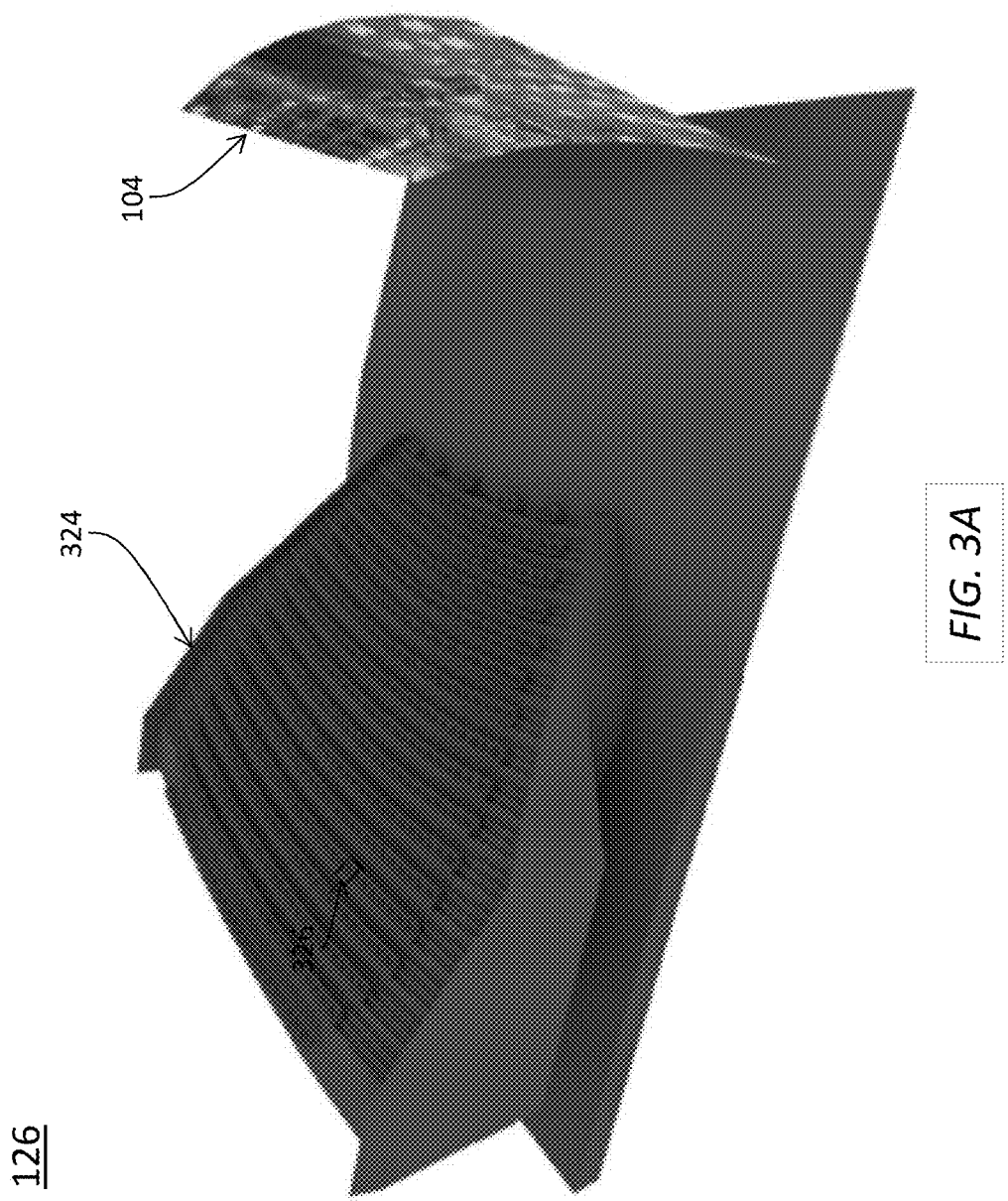
FIG. 3A and FIG. 3B illustrate example multi-viewer environments in which a cinema display serves as a shared display for multiple viewers.

FIG. 3A illustrates a perspective view of an example multi-viewer environment comprising a 3D space (e.g., 126, etc.) and a cinema display (e.g., 104, etc.) as a shared display for multiple viewers. The 3D space (126) may comprise an audience area 324 comprising a plurality of seating spaces (e.g., 326, etc.). The multiple viewers wearing their respective wearable devices may be seated in the plurality of seating spaces in the audience area (324) to view cinema image content rendered on the cinema display (104) and view properly overlaid device image content individually rendered by the wearable devices simultaneously with viewing the cinema image content. Given a specific geometric configuration of the 3D space (126), heights, linear distances and angular distances of the wearable devices may vary substantially in relation to the cinema display (104) in the multi-viewer environment.

Actual seat positions of viewers and their wearable devices can be determined in any combination of one or more of multiple different ways. In an example, a specific seat position (or a specific seating space) of a viewer and the viewer's wearable device can be determined based on a specific ticket issued to the viewer or the viewer's wearable device. In another example, fiducial markers may be embedded in cinema image content or in surround spatial areas to the cinema display (104). The wearable device (or headset) can acquire tracking images with image markers generated in response to light rays from the fiducial markers. Based on the image markers in the tracking images, the wearable device can (e.g., precisely, etc.) determine spatial positions and/or spatial directions of the wearable device at any given time in an augmented entertainment session. Example determinations of spatial positions and/or spatial directions of wearable devices based on fiducial markers can be found in the previously mentioned U.S. patent application Ser. No. 15/949,720, with the application title of "ADAPTING VIDEO IMAGES FOR WEARABLE DEVICES" by Ajit Ninan and Neil Mammen filed on 10 Apr. 2018.

In a further example, different wearable devices (e.g., AR headsets, etc.) may be affixed or assigned to their respective seating positions (or seating spaces) in the 3D space (126).

Additionally, optionally or alternatively, radio-frequency (RF) location detection may be used to determine spatial positions and/or spatial directions of a wearable device at any given time in an augmented entertainment session. Example determinations of spatial positions and/or spatial directions of wearable devices based on RF location detection can be found in U.S. Pat. No. 7,580,378, the entire contents of which are hereby incorporated by reference as if fully set forth herein.

Figure 3B:
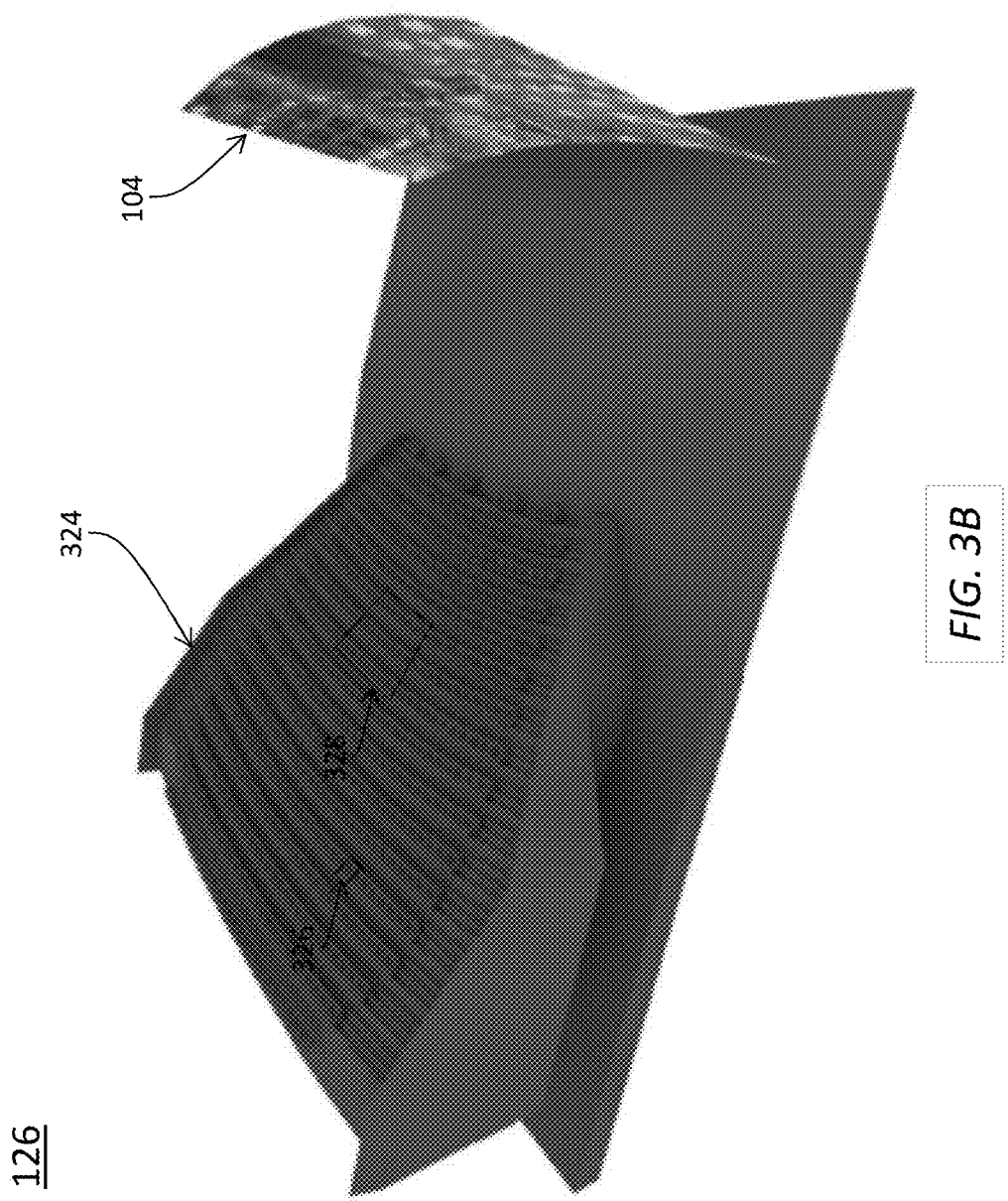

In some embodiments, a (e.g., relatively large, etc.) 3D space (126) may be segregated into multiple zones (e.g., one of which may be 328 of FIG. 3B, etc.). Multiple media streaming servers can be used to stream device image content to viewers in the multiple zones (e.g., 328, etc.). Viewers in each zone (e.g., 328, etc.) can be supported by a respective media streaming server in the multiple media streaming servers. In some embodiments, the media streaming server generates viewer-specific device image content for each viewer of the viewers seated in the zone (328) designated for supported by the media streaming server. Upon receiving the viewer-specific device image content, the viewer's wearable device in the zone (328) may render the viewer-specific device image content with no or little further adaptation or with relatively simple image rendering operations (e.g., image interpolation/reconstruction/selection, etc.). In some embodiments, the media streaming server may generate zone-specific device image content for all the viewers in the zone in the zone (328) supported by the media streaming server. Upon receiving the zone-specific device image content, an individual viewer's wearable device in the zone (328) may adapt the zone-specific device image content based on spatial positions and/or spatial directions of the wearable device and render the adapted device image content.

The augmented entertainment system can implement or operate with device tracking techniques to determine spatial positions and/or spatial directions of wearable devices in real time in an augmented entertainment session (e.g., a VR session, an AR session, a remote presence session, a computer game session, a movie, etc.). Some or all of these device tracking techniques can be scaled to concurrently track/monitor spatial positions and/or spatial directions of wearable devices of a relatively large number of viewers. The spatial positions and/or the spatial directions of wearable devices may be used to adapt device image content into specifically adapted device image content for individual wearable devices and individual viewers and to render the specifically adapted device image content on the individual wearable devices.

Example device tracking techniques may include, but are not necessarily limited to only, any of: tracking techniques performed by wearable devices alone, tracking techniques performed by external devices alone, tracking techniques performed in part by wearable devices and in part by the external devices, outside-in device tracking, inside-out device tracking, distributed device tracking by multiple devices in collaboration, tracking based on fiducial marks, tracking based on RF or infrared signals, etc. Some or all of these device tracking techniques can be specifically adapted to specific environments in which augmented entertainment systems operate. Some or all of these device tracking techniques may be implemented with relatively low costs, relatively low complexity, relatively high redundancy for resilience, relatively high accuracy, relatively high numbers of multiple viewers, etc.

Additionally, optionally or alternatively, device ID information including but not limited to MAC addresses, network addresses, IP addresses, etc., of the wearable devices may be obtained by the device tracking techniques as described herein.

Some or all of the spatial positions, the spatial directions, the device ID information, network addresses, etc., of the wearable devices may be used to communicate and register the wearable devices (individually or in a group/zone) with respective media streaming servers to obtain or download device image content to be synchronously rendered with the cinema image content.

The device ID information, specific spatial positions and/or specific spatial directions of the wearable devices at a particular time point, etc., may be used to synchronize streaming and rendering device image content generated for the particular time point with streaming and rendering cinema image content generated for the particular time point. For example, single-layer cinema images used to generate a 3D cinema display image to be rendered on the cinema display (104) at a first time point may be indexed by a time stamp logically indicating the first time point. Corresponding single-layer device images used to generate a corresponding 3D device display image to be rendered with a wearable device at the same first time point may be indexed by the same time stamp. Thus, both the wearable device and the cinema image renderer (106) can display the 3D cinema display image and the corresponding 3D device display image simultaneously.

FIG. 2C illustrates an example configuration 100-2 of an augmented entertainment system that comprises a device tracker 122 operating with a tracking sensor assembly 124 to monitor a plurality of wearable devices such as a first wearable device 102-1 used by a first viewer 112-1, a second wearable device 102-2 used by a second viewer 112-2, etc., in a 3D space (e.g., 126, etc.). As illustrated in FIG. 2C, the augmented entertainment system further comprises a cinema image renderer (e.g., 106, etc.), a device image renderer (e.g., 108, etc.), an image content receiver (e.g., 110, etc.), a cinema display (e.g., 104, etc.), one or more wearable devices. Some or all of the components/devices as depicted in FIG. 2C may be implemented by one or more mechanical components, one or more electrooptical components, one or more computing devices, modules, units, etc., in software, hardware, a combination of software and hardware, etc. Some or all of the components/devices as depicted in FIG. 2C may be communicatively (e.g., wirelessly, with wired connections, etc.) coupled with some other components/devices as depicted in FIG. 2C or with other components/devices not depicted in FIG. 2C.

In some embodiments, the device tracker (122) and the tracking sensor assembly (124) represent a central tracking system that is remote from the wearable devices that are under tracking. The device tracker (122) and the tracking sensor assembly (124) can accomplish device tracking operations with the wearable devices without requiring the wearable devices to implement complicated and/or active self-tracking functionality. Thus, the wearable devices can be made with relatively simple designs at relatively low costs. Example device trackers operating with tracking sensor assemblies can be found in the previously mentioned U.S. patent application Ser. No. 15/949,536, with the application title of "PASSIVE MULTI-WEARABLE-DEVICES TRACKING" by Ajit Ninan and Neil Mammen filed on 10 Apr. 2018.

The central tracking system as described herein can be used to accurately, reliably and responsively track physical movements of a single wearable device or multiple wearable devices. Components used for tracking purposes do not need to be miniaturized into relatively tiny footprints and mechanically and/or electrically incorporated into an overall form factor of a wearable device. Complex analysis algorithms for tracking spatial positions and viewing directions of the wearable device do not need to be designed, perfected, and implemented in the wearable device.

In some embodiments, the cinema image renderer (106), the device image renderer (108) and the device tracker (122) can be implemented in one or more central media servers located away from the wearable devices (e.g., 102-1, 102-2, etc.). The device tracker (122) operating in conjunction with the tracking sensor assembly (124) determines spatial positions and/or spatial directions of the wearable devices (e.g., 102-1, 102-2, etc.) in real time in an augmented entertainment session (e.g., a VR session, an AR session, a remote presence session, a computer game session, a movie, etc.).

The first wearable device (102-1) may, but is not necessarily limited to only, to be a rigid-body device spatial positions on which can be represented in a three-dimensional spatial coordinate system stationary relative to the first wearable device (102-1). The device-stationary Cartesian coordinate system in relation to the reference Cartesian coordinate system can be used to represent spatial positions and spatial directions on the first wearable device (102-1). The device-stationary Cartesian coordinate system comprises three spatial dimensions represented by respective axes including an x1-axis and a z1-axis, and a y1-axis orthogonal to both the x1 and z1 axes that is not depicted in FIG. 2C. The device-stationary Cartesian coordinate system may comprise a coordinate system origin at a device-stationary spatial position denoted as "p1". The device-stationary spatial position "p1" may be selected from any spatial position stationary to the first wearable device (102-1). In some embodiments, if there is a spatial location that is a point of symmetry on the first wearable device (102-1), then such spatial location can be selected as the device-stationary spatial position "p1" to serve as the coordinate origin to the device-stationary Cartesian coordinate system.

Similarly, the second wearable device (102-2) may, but is not necessarily limited to only, to be a rigid-body device spatial positions on which can be represented in a second three-dimensional spatial coordinate system stationary relative to the second wearable device (102-2). The second device-stationary Cartesian coordinate system in relation to the reference Cartesian coordinate system can be used to represent spatial positions and spatial directions on the second wearable device (102-2). The second device-stationary Cartesian coordinate system comprises three spatial dimensions represented by respective axes including an x2-axis and a z2-axis, and a y2-axis orthogonal to both the x2 and z2 axes that is not depicted in FIG. 2C. The second device-stationary Cartesian coordinate system may comprise a coordinate system origin at a device-stationary spatial position denoted as "p2". The device-stationary spatial position "p2" may be selected from any spatial position stationary to the first wearable device (102-1). In some embodiments, if there is a spatial location that is a point of symmetry on the second wearable device (102-2), then such spatial location can be selected as the device-stationary spatial position "p2" to serve as the coordinate origin to the second device-stationary Cartesian coordinate system.

The spatial positions and/or the spatial directions of the wearable devices (e.g., 102-1, 102-2, etc.) may be used to adapt device image content into specifically adapted device image content for individual wearable devices and individual viewers and to render the specifically adapted device image content on the individual wearable devices.

In addition, the spatial positions and/or the spatial directions of the wearable devices (e.g., 102-1, 102-2, etc.) may be provided as functions of time to the cinema image renderer (106) and the device image renderer (108). Based on the spatial positions, the spatial directions, etc., of the wearable devices (e.g., 102-1, 102-2, etc.), the cinema image renderer (106) and the device image renderer can synchronize streaming and rendering device image content generated for a particular time point with streaming and rendering cinema image content generated for the particular time point, for example, via a common timestamp that indexes the cinema image content and the device image content. Timestamps that index the cinema image content the device image content can be stored or transmitted with the cinema image content the device image content. While cinema display images are being rendered on the cinema display, corresponding device display images are streamed to the wearable devices (e.g., beforehand, etc.) and rendered on the device displays synchronously with the rendering of the cinema display images on the cinema display at the same time.

In some embodiments, some or all of the cinema image content and the device image content can be stored locally instead of or in addition to being streamed wirelessly or with wired data connections from an image content receiver or an image renderer. For example, the device image content may be fetched from local hard drives (e.g., available from USB data connections at individual seating spaces of viewers, etc.). Timestamps, pinging messages, etc., may be sent by a cinema image renderer to all wearable devices in the 3D space (126) to identify what corresponding device image content should be rendered synchronously with the rendering of the cinema image content being rendered on the cinema display. Additionally, optionally or alternatively, watermarking, fingerprints derived from running fingerprint algorithms on media content, fiducial marks, etc., may be embedded, carried, displayed, transmitted or tracked for the purpose of synchronizing the rendering of corresponding device image content with the cinema image content, instead of or in addition to timestamps, pinging messages, etc.

Thus, the central tracking system as implemented with the device tracker (122) and the tracking sensor assembly (124) can be used to make it a relatively efficient operation to synchronize streaming and rendering the cinema image content and the device image content in the augmented entertainment system, in comparison with an entertainment system with distributed device tracking that is likely to incur relatively high device manufacturing costs, relatively high device maintenance costs (e.g., relatively high device washing/cleaning costs in a commercial setting that shares a wearable device among different successive viewers, etc.) relatively high communication costs, relatively high synchronization costs.

A wearable device (e.g., 102-1, 102-2, etc.), etc., may be driven, for example by a user (e.g., 112-1, 112-2, etc.), to make relative motions in relation to stationary objects or stationary coordinate systems such as the cinema display (104) stationary in the 3D space (126). These relative motions may be represented by any combination of one or more of: linear positions/displacements, angular positions/displacements, linear velocities/speeds, angular velocities/speeds, linear accelerations, rotational accelerations, etc.

For example, the wearable device (e.g., 102-1, 102-2, etc.) may be a 3D physical object that has a specific spatial position and a specific spatial direction at any given time point in a physical space such as a movie theater, a home entertainment space, a venue, etc.

The specific spatial position of the wearable device (e.g., 102-1, 102-2, etc.) may be characterized or measured by spatial coordinates of a specific linear position of the wearable device (e.g., 102-1, 102-2, etc.). Examples of such a specific linear position may be a point of spatial symmetry, a geometric center point, etc., of an eyeglass frame, a position corresponding to the middle point between the viewer's eyes, etc. Example spatial coordinates of a linear position may be spatial coordinates of a Cartesian coordinate system, a polar coordinate system, and the like.

The specific spatial direction of the wearable device (e.g., 102-1, 102-2, etc.) may be characterized or measured by spatial coordinates of an angular position of a specific three-dimensional coordinate system (e.g., a first device-stationary Cartesian coordinate system of the first wearable device (102-1), a second device-stationary Cartesian coordinate system of the second wearable device (102-2), etc.) rigidly affixed to or stationary with the wearable device (e.g., 102-1, 102-2, etc.) in reference to a reference three-dimensional coordinate system stationary in the 3D space (126). The reference three-dimensional coordinate system in the 3D space (126) may be a reference Cartesian coordinate system comprising x, y and z axes (only x and z axes are shown in FIG. 2C) with its coordinate origin located at a selected position "p" of the cinema display (104). Example device-stationary three-dimensional coordinate systems rigidly affixed to or stationary with the wearable image rendering device (102) may be a three-dimensional Cartesian coordinate systems with a positive z-direction corresponding to the viewer's frontal viewing direction, an x-direction parallel to the interpupil distance of the viewer, and a y-direction perpendicular to the x and z directions. Example spatial coordinates of the angular position may be pitch, yaw, roll, etc.

The specific spatial position and the specific spatial direction of the wearable device (e.g., 102-1, 102-2, etc.) may be generally characterized by six spatial dimensions, three of which relate to translations, and the other three of which relate to rotations. In some embodiments, the six spatial dimensions used to characterize of the specific spatial position and the specific spatial direction of the wearable device (e.g., 102-1, 102-2, etc.) are fully independent with respect to one another. In these embodiments, the wearable device (e.g., 102-1, 102-2, etc.) has six degrees of freedom. However, it is possible that linear or angular positions corresponding to a given degree of freedom may still be limited to a range.

For example, in a movie theater, linear positions of the wearable device (e.g., 102-1, 102-2, etc.) along an x-direction (e.g., sways, etc.) in the reference Cartesian coordinate system stationary to the cinema display (104) may be limited to a range corresponding to a fraction of a width of an assigned seat to the viewer (e.g., 112-1, 112-2, etc.). Linear positions of the wearable device (e.g., 102-1, 102-2, etc.) along an y-direction (heaves) in the Cartesian coordinate system stationary to the cinema display (104) may be limited to a range corresponding to a fraction of the viewer's head. Linear positions of the wearable device (e.g., 102-1, 102-2, etc.) along a z-direction (e.g., surges, etc.) in the Cartesian coordinate system stationary to the cinema display (104) may be limited to a range between the back of the seat of the viewer (e.g., 112-1, 112-2, etc.) and the back of a seat directly in front of the seat of the viewer (e.g., 112-1, 112-2, etc.).

Technique as described herein can be used to support viewing omnidirectional images up to 360 degrees (or up to the entire 4π (solid angle of a sphere). For example, a wearable device as described herein may view direction-specific device display images from any viewing angle up to 360 degrees (or up to the entire 4π (solid angle of a sphere), even though a cinema display on which cinema display images are rendered is fixed or stationary in a 3D space. When viewing away from the cinema display, a viewer of a wearable device may view only the device display images derived from single-layer device images in one or more device image layers. However, in some operational scenarios, angular positions of the wearable device (e.g., 102-1, 102-2, etc.) for yaws in reference to the cinema display (104) may be limited to a first range (e.g., +/−20 angular degrees, +/−30 angular degrees, up to +/−180 angular degrees, etc.) of frontal viewing directions. Angular positions of the wearable device (e.g., 102-1, 102-2, etc.) for rolls in reference to the cinema display (104) may be limited to a second range (e.g., +/−20 angular degrees, +/−30 angular degrees, up to +/−180 angular degrees, etc.) of frontal viewing directions. Angular positions of the wearable device (e.g., 102-1, 102-2, etc.) for pitches in reference to the cinema display (104) may be limited to a third range (e.g., +/−20 angular degrees, +/−30 angular degrees, up to +/−180 angular degrees, etc.) of frontal viewing directions. These angular ranges may be constrained differently. For example, the third range may be set to be relatively small as pitch motions tend to generate relatively serious nauseas and physiological discomforts.

If any of the above-mentioned positional or angular ranges shrinks, or is constrained, to a single value, then a degree of freedom corresponding the single-value positional or angular range is lost or removed from the six degrees of freedom. The wearable device (e.g., 102-1, 102-2, etc.) has zero degree of freedom when the wearable device (e.g., 102-1, 102-2, etc.) is (e.g., logically, physically, etc.) fixed in translation and in rotation relative to the cinema display (104). The wearable device (e.g., 102-1, 102-2, etc.) has one degree of freedom when the wearable device (e.g., 102-1, 102-2, etc.) is fixed in rotation but is confined to move along a line or a one-dimensional curve in translation relative to the cinema display (104). Similarly, the wearable device (e.g., 102-1, 102-2, etc.) has one degree of freedom when the wearable device (e.g., 102-1, 102-2, etc.) is fixed in translation but is confined to rotate in a single rotational direction relative to the cinema display (104).

In some embodiments, the device tracker (122) operating in conjunction with the tracking sensor assembly (124) the latter of which is deployed in the 3D space (126) monitors spatial positions and spatial directions of the wearable devices in the 3D space (126). In some embodiments, the wearable device (e.g., 102-1, 102-2, etc.) has light sources removably or irremovably attached to, or otherwise installed on, the wearable device (e.g., 102-1, 102-2, etc.). These light sources may emit or reflect off light rays such as light rays of visible light wavelengths, light rays of invisible light wavelengths, infrared lights, etc. Examples of light sources may include, but are not necessarily limited to only, any of: light emitters, light emitting diodes (LEDs), non-LED lights, light regenerators, light reflectors, light scattering devices, retroreflectors, etc. By way of example but not limitation, light sources on the wearable device (e.g., 102-1, 102-2, etc.) emit or reflect off invisible light such as infrared light, etc., for device tracking purposes.

In some embodiments, one or more tracking image sensors in the tracking sensor assembly (124) generate device tracking images that capture light rays from light sources placed on the wearable devices including but not limited to the wearable device (e.g., 102-1, 102-2, etc.). These light rays may be emitted, reflected/redirected/scattered toward, etc., the tracking image sensors in the tracking sensor assembly (124). These light rays may be captured continuously, at a set time schedule, etc. For example, the device tracking images may be taken at a time resolution of a millisecond or a fraction of millisecond, at a time resolution of every hundredth second, at a time resolution of every tenth second, etc.

In some embodiments, the device tracker (122) tracks or determines spatial positions and spatial directions of each of the wearable devices at a given time point (e.g., over a time interval, over the entire time duration of a 3D movie, etc.) based on one or more device tracking images captured at the given time point by the tracking image sensors (124) from light rays from light sources of the wearable devices.

In some embodiments, the device image renderer (108) receives, from the device tracker (122), spatial positions and spatial directions (e.g., p1, a1, p2, a2, etc.) of the wearable device (e.g., 102-1, 102-2, etc.) over time (e.g., over a time interval, over the entire time duration of a 3D movie, etc.). Based on the spatial positions and spatial directions of the wearable device (e.g., 102-1, 102-2, etc.), the device image renderer (108) can determine spatial relationships between the wearable device (e.g., 102-1, 102-2, etc.) and the cinema display (104). In some embodiment, these spatial relationships may be represented by one or more of: linear positions/displacements, angular positions/displacements, linear or angular velocities, linear or angular speeds, linear or angular accelerations, etc., of the wearable device (e.g., 102-1, 102-2, etc.) in relation to the cinema display (104) or the reference Cartesian coordinate system in the 3D space (126).

For example, based on the single-layer device images derived from the multi-view unlayered image, the device image renderer (108) can determine one or more 3D device images comprising one or more left view device images and one or more right view device images. The device image renderer (108) or the wearable device (e.g., 102-1, 102-2, etc.) may perform a spatial transformation on the one or more left view device images and the one or more right view device images (in the one or more 3D device images)—before rendering them—based on the spatial relationships between the wearable device (e.g., 102-1, 102-2, etc.) and the cinema display (104).

Based on the left view device images and the right view device images as transformed by the spatial transformation, the device image renderer (108) can cause the wearable device (e.g., 102-1, 102-2, etc.) to render these left view device images and right view device images on one or more device displays (e.g., 116, etc.). The device image renderer (108) can communicate control information, status information, positional data, image data such as the device images, metadata, etc., with wearable image rendering devices (e.g., 102-1, 102-2, etc.) over one or more data connections. Example data connections may include, but are not limited, wireless data connections, wired data connections, radio-frequency based data connections, cellular data connections, Wi-Fi data connections, infrared-based data connections, data connections over HDMI cable, data connections over optical cable, data connections over High-Speed Serial Interface (HSSI), High-Definition Serial Digital Interface (HD-SDI), 12G-SDI, USB cable, and the like to seat/armrest/floor, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the image content receiver (110).

In some embodiments, instead of using an external device tracker such as 122 shown in FIG. 2C, an internal device tracker may be used to track/monitor the spatial positions and/or spatial directions of the wearable device (e.g., 102-1, 102-2, etc.); generate the positional and directional data of the wearable device (e.g., 102-1, 102-2, etc.) based on the spatial positions and/or spatial directions of the wearable device (e.g., 102-1, 102-2, etc.); etc.

In some embodiments, the device image renderer (108) may or may not operation with only a single wearable device (e.g., 102-1, etc.). By way of example but not limitation, the device image renderer (108) as illustrated in FIG. 2C operates with more than one wearable device (e.g., 102-1 and 102-2, etc.) concurrently.

In some embodiments, the device image renderer (108) receives video streams for the wearable devices (102-1 and 102-2); generates one or more display images from video data in the video streams for each wearable device (102-1 or 102-2) in accordance with the positional and directional data of each such wearable device (102-1 or 102-2); causes the one or more display images to be rendered with the respective wearable device (102-1 or 102-2) to the viewer (112-1 or 112-2); etc.

6. Example Process Flows

Figure 4A:
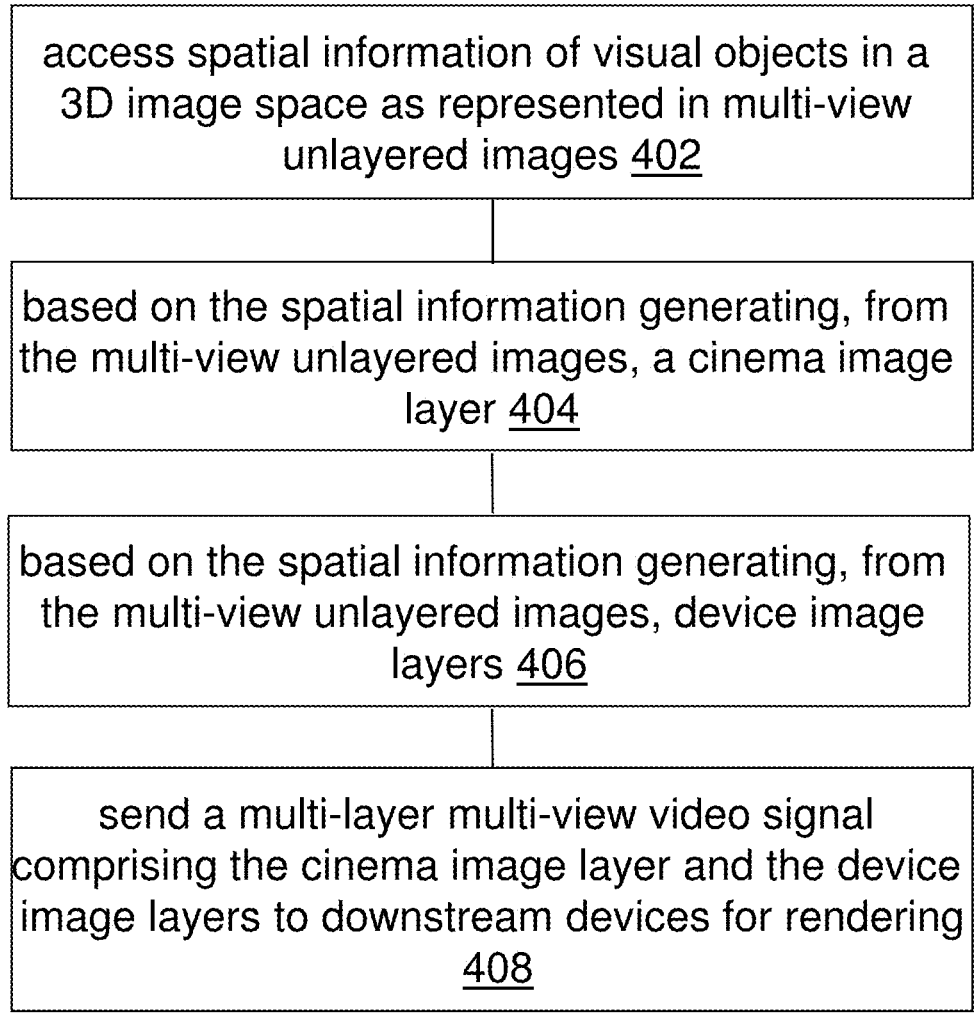
FIG. 4A and FIG. 4B illustrate example process flows.

FIG. 4A illustrates an example process flow according to an example embodiment of the present invention. In some example embodiments, one or more computing devices or components may perform this process flow. In block 402, a layered image encoder (e.g., 180 of FIG. 2A, etc.) accesses spatial information that describes spatial locations of a plurality of visual objects as in a three-dimensional (3D) image space as represented in one or more multi-view unlayered images. Each of the one or more multi-view unlayered images comprises a plurality of single-view unlayered images corresponding to a plurality of viewing directions.

In block 404, based on the spatial information that describes the spatial locations of the plurality of visual objects in the 3D image space as represented in the one or more multi-view unlayered images, the layered image encoder (180) generates, from the one or more multi-view unlayered images, a cinema image layer comprising one or more single-layer cinema images depicting a first proper subset of one or more visual objects in the plurality of visual objects.

In block 406, based on the spatial information that describes the spatial locations of the plurality of visual objects in the 3D image space as represented in the one or more multi-view unlayered images, the layered image encoder (180) generates, from the one or more multi-view unlayered images, one or more device image layers each of which comprises one or more single-layer device images depicting one or more second proper subsets of one or more visual objects in the plurality of visual objects.

In block 408, the layered image encoder (180) sending a multi-layer multi-view video signal comprising the one or more single-layer cinema images in the cinema image layer and the one or more single-layer device images in the one or more device image layers to one or more downstream devices for rendering.

In an embodiment, the spatial information represents one or more of: depth information, disparity information, parallax information, 3D mesh information, epipolar information, tensor map information, etc.

In an embodiment, the 3D image space represents one of: one or more real-world scenes, one or more virtual-world scenes, a combination of one or more real-world scenes and one or more virtual-world scenes, etc.

In an embodiment, the plurality of visual objects in the 3D image space as represented in the one or more multi-view unlayered images are separated into the cinema image layer and the one or more device image layers using one or more layer-separation surfaces. In an embodiment, at least one of the one or more layer-separation surfaces coincides with a cinema display that is to be used for rendering cinema display images generated from the single-layer cinema images in the cinema image layer. In an embodiment, none of the one or more layer-separation surfaces coincides with a cinema display that is to be used for rendering cinema display images generated from the single-layer cinema images in the cinema image layer.

In an embodiment, at least one of the single-layer cinema images in the cinema image layer and the single-layer device images in the one or more device image layers is generated using a 3D pixel distribution generated with a tensor map.

In an embodiment, the plurality of visual objects in the 3D image space as represented in the one or more multi-view unlayered images are separated into the cinema image layer and the one or more device image layers based on one or more of: spatial locations of displays in a 3D reference space; spatial locations of a viewer at a reference spatial location in 3D reference space; spatial positions of visual objects as projected into the 3D reference space in relation to the spatial locations of the displays or the viewer; spatial directions of visual objects in the 3D reference space relative to the viewer (112-0); relative artistic importance of visual objects; visual properties of visual objects; motion characteristics of visual objects; past, present or future spatial locations of visual objects; past, present or future spatial directions of visual objects; etc.

Figure 4B:
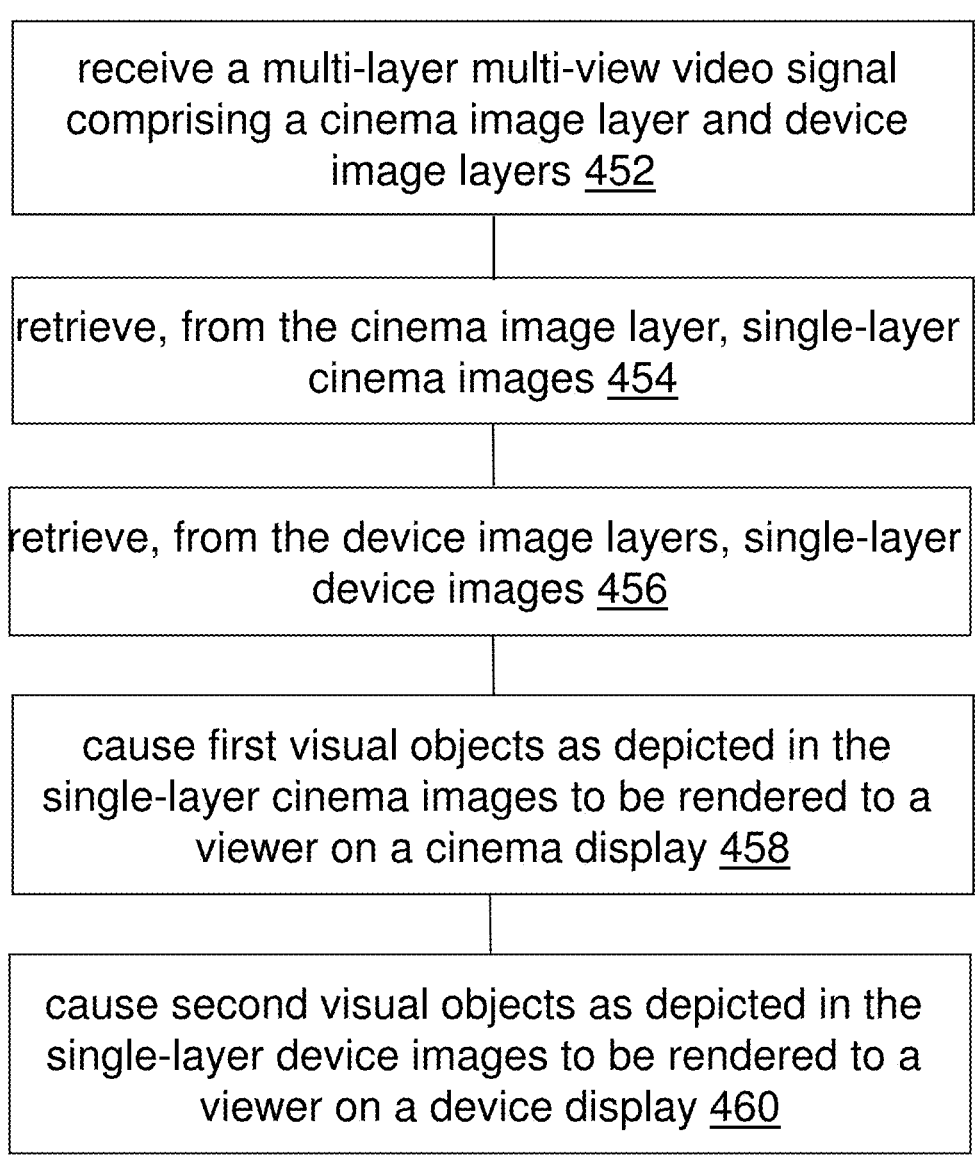

FIG. 4B illustrates an example process flow according to an example embodiment of the present invention. In some example embodiments, one or more computing devices or components may perform this process flow. In block 452, an augmented entertainment system (e.g., as illustrated in FIG. 2A, FIG. 2B or FIG. 2C, etc.) receives a multi-layer multi-view video signal comprising one or more single-layer cinema images in a cinema image layer and one or more single-layer device images in one or more device image layers. The single-layer cinema images in the cinema image layer and the single-layer device images in the one or more device image layers were previously derived from one or more multi-view unlayered images.

In block 454, the augmented entertainment system retrieves, from the cinema image layer of the multi-layer multi-view video signal, the one or more single-layer cinema images, the one or more single-layer cinema images depicting a first proper subset of one or more visual objects in a plurality of visual objects as originally depicted by the one or more multi-view unlayered images.

In block 456, the augmented entertainment system retrieves, from the one or more device image layers of the multi-layer multi-view video signal, the one or more single-layer device images, the one or more device images depicting one or more second proper subsets of one or more visual objects in the plurality of visual objects as originally depicted by the one or more multi-view unlayered images.

In block 458, the augmented entertainment system causes the first proper subset of visual objects as depicted in the one or more single-layer cinema images to be rendered to a viewer on a cinema display in a 3D space.

In block 460, the augmented entertainment system causes the one or more second proper subsets of visual objects as depicted in the one or more single-layer device images to be rendered concurrently to the viewer on a device display in the 3D space.

In an embodiment, the first proper subset of visual objects as rendered on the cinema display and the one or more second proper subsets of visual objects as rendered on the device display collective depict the plurality of visual objects located at the same spatial locations in a 3D image space, as originally depicted by the one or more multi-view unlayered images. In an embodiment, spatial information describing the spatial locations in the 3D image space at which the plurality of visual object is located was previously used to partition the plurality of visual objects, as originally depicted by the one or more multi-view unlayered images, into the cinema image layer and the one or more device image layers.

In an embodiment, the device display is spatially movable with one or more degrees of freedom relative to the cinema display.

In an embodiment, the device display is used by a wearable device to render images; the device display is spatially fixed relative to the wearable device.

In an embodiment, the cinema display is a stationary display; the device display represents a head-mounted display of a wearable device used by the viewer.

In an embodiment, the cinema display in the 3D space is used to define a layer-separation surface in the 3D image space; the plurality of visual objects is partitioned into the first proper subset of visual objects and the one or more second proper subsets of visual objects based at least in part on spatial relationships of the plurality of visual objects in relation to the layer-separation surface.

In an embodiment, the one or more second proper subsets of visual objects are selected from among the plurality of visual objects based on spatial distances to the layer-separation surface.

In an embodiment, at least one visual object among the plurality of visual objects strides the layer-separation surface; the first proper subset of visual objects includes a portion of the at least one visual object; the one or more second proper subsets of visual objects includes a remaining portion of the at least one visual object.

In an embodiment, the cinema display represents a spatial surface of zero parallax in the 3D space; a visual object depicted by a cinema display image as behind the cinema display is of positive parallaxes; a visual object depicted by the cinema display image as in front of the cinema display is of negative parallaxes; the plurality of visual objects is partitioned into the first proper subset of visual objects and the one or more second proper subsets of visual objects based on individual parallaxes of individual visual objects in the plurality of visual objects.

In an embodiment, all visual objects in the one or more second proper subsets of visual objects are to be of negative parallaxes if the one or more second proper subsets of visual objects were to be rendered by cinema display images rendered on the cinema display.

In an embodiment, at least one visual object in the one or more second proper subsets of visual objects is to be of positive parallax if the one or more second proper subsets of visual objects were to be rendered by cinema display images rendered on the cinema display.

In an embodiment, the augmented entertainment system is further configured to perform: causing two different proper subsets of visual objects in the one or more second proper subsets of visual objects as depicted in the one or more single-layer device images to be rendered on the device display at two different image planes of two different distances to the viewer.

In an embodiment, the device display renders device display images at an image plane of a distance that is tunable based on vergence angles of the viewer.

In an embodiment, the device display renders device display images at an image plane of a distance that is fixed in relation to the viewer.

In an embodiment, the augmented entertainment system is further configured to perform: adapting the one or more single-layer device images into device display images using spatial transformations based on one or more of: specific spatial positions or specific spatial directions, of a wearable device that includes the device display.

In an embodiment, the spatial transformations reconstruct a tensor model that was previously used to generate the cinema image layer and the one or more device image layers from the one or more multi-view unlayered images.

In an embodiment, cinema display images rendered on the cinema display represents one of: two-dimensional images, or 3D images.

In an embodiment, a wearable device that includes the device display is among a plurality of wearable devices in the 3D space that automatically register with a media system for receiving device image content to be concurrently rendered as cinema image content is being rendered on the cinema display. In an embodiment, the wearable devices that automatically register with the media system based on one or more of: specific seat positions based on specific issued tickets to viewers of the wearable devices, fiducial markers embedded in cinema image content or in surround spatial areas to the cinema display, light rays encoded with device ID information, radio-frequency (RF) location detection, specific zones of an audience area in the 3D space, etc.

In an embodiment, a wearable device that includes the device display is among a plurality of wearable devices in the 3D space that divided into a plurality of zones in an audience area in the 3D space; first wearable devices in a first zone in the plurality of zones receive device image content from a first device image content server (e.g., a first device image renderer, etc.); second wearable devices in a second zone in the plurality of zones receive device image content from a second device image content server (e.g., a second device image renderer, etc.).

In an embodiment, the augmented entertainment system is further configured to perform: tracking wearable devices with device sensor assemblies that are installed at one or more spatial installation locations in the 3D place. In an embodiment, at least one of the device sensor assemblies is at one of: ceiling, wall, floor, spatial areas near the cinema display, spatial areas away from the cinema display, seating spaces, backs of seats, etc., in the 3D place.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
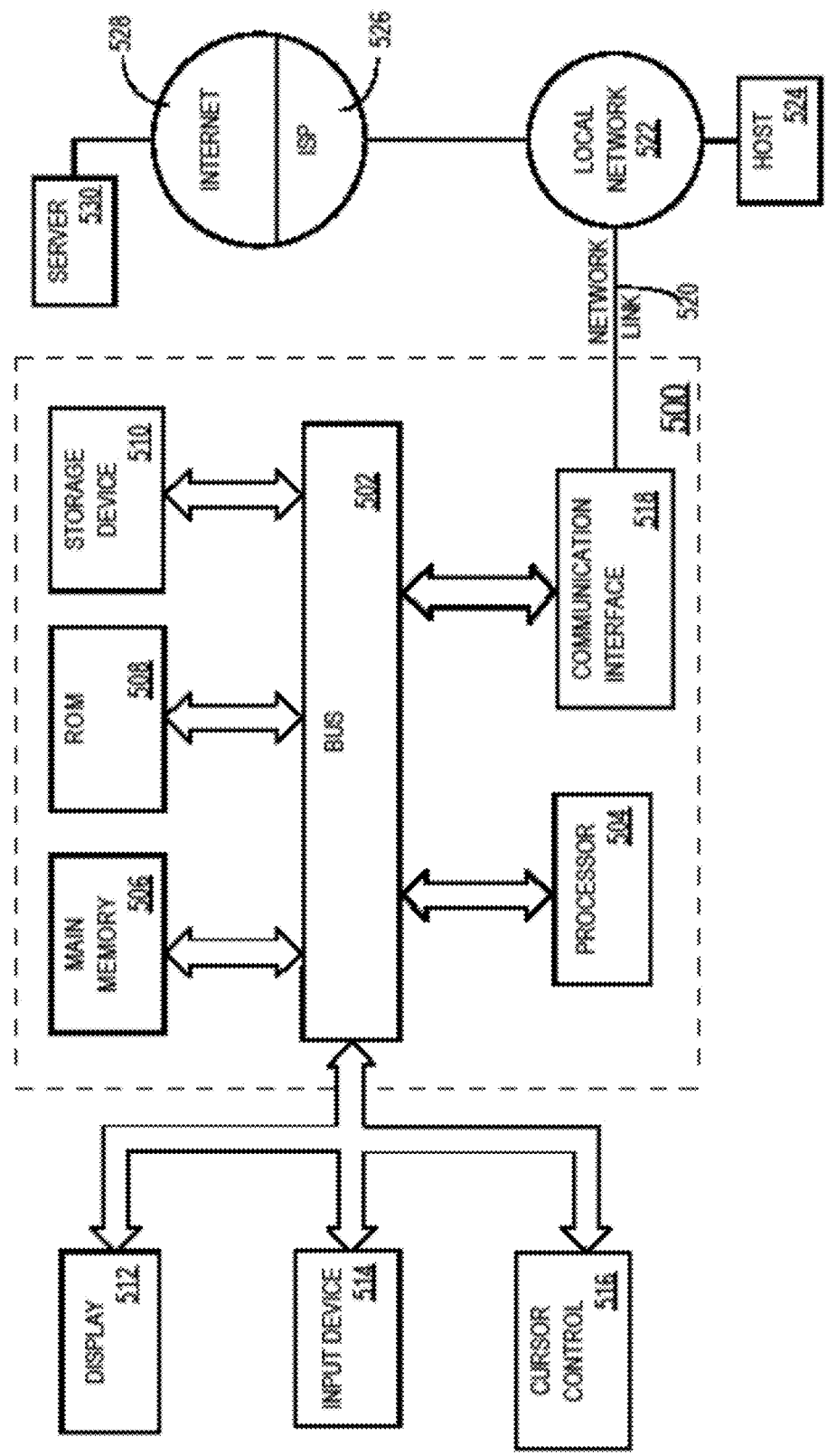
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives And Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a cinema image depicting one or more first visual objects;
   receiving a device image depicting one or more second visual objects, wherein the one or more first visual objects include at least one visual object that has a portion excluded from all of the one or more second visual objects;
   wherein both the one or more first visual objects and the one or more second visual objects are determined to be depicted in a multi-view image from which both the cinema image and the device image are derived;
   causing the cinema image depicting the one or more first visual objects to be rendered and displayed to a viewer on a cinema display while causing the device image depicting the one or more second visual objects to be concurrently rendered and displayed to the same viewer on a device display.

2. The method of claim 1, wherein the device display is spatially movable with one or more degrees of freedom relative to the cinema display.

3. The method of claim 1, wherein the device display is used by a wearable device to render images; and wherein the device display is spatially fixed relative to the wearable device.

4. The method of claim 1, wherein the cinema display is a stationary display, and wherein the device display represents a head-mounted display of a wearable device used by the viewer.

5. The method of claim 1, wherein a layer-separation surface in a three-dimensional 3D image space depicted in the multi-view image is used to distinguish, in the multi-view image, the one or more first visual objects from the one or more second visual objects.

6. The method of claim 5, wherein the one or more second visual objects are selected from among a plurality of visual objects depicted in the multi-view image based on spatial distances to the layer-separation surface.

7. The method of claim 5, wherein at least one visual object among a plurality of visual objects depicted in the multi-view image strides the layer-separation surface; wherein the first one or more visual objects include a portion of the at least one visual object; and wherein the one or more second visual objects include a remaining portion of the at least one visual object.

8. The method of claim 1, wherein the cinema display represents a spatial surface of zero parallax in a 3D space in which the cinema display and the device display are located; wherein the one or more first visual objects include a first visual object of positive parallax depicted as behind the cinema display; wherein the one or more second visual objects include a second visual object of negative parallax depicted as in front of the cinema display.

9. The method of claim 1, wherein all of the one or more second visual objects are depicted as in front of the cinema display.

10. The method of claim 1, wherein the one or more first visual objects include at least one visual object depicted as in front of the cinema display.

11. The method of claim 1 further comprising: causing two different proper subsets of visual objects in the one or more second visual objects to be rendered on the device display at two different image planes of two different distances to the viewer.

12. The method of claim 1, wherein the device display renders device images at an image plane of a distance that is tunable based on vergence angles of the viewer.

13. The method of claim 1, wherein the device display renders device images at an image plane of a distance that is fixed in relation to the viewer.

14. The method of claim 1, further comprising adapting device images to be rendered on the device display using spatial transformations based on one or more of: specific spatial positions or specific spatial directions, of a wearable device that includes the device display.

15. The method of claim 14, wherein the spatial transformations reconstruct a tensor model that was used to generate device images from multi-view images.

16. The method of claim 1, wherein cinema images rendered on the cinema display represent one of: two-dimensional images, or three-dimensional images.

17. The method of claim 1, wherein a wearable device that includes the device display is among a plurality of wearable devices, located in a three-dimensional (3D) space, that automatically register with a media system for receiving device image content to be concurrently rendered on a plurality of device displays included in the plurality of wearable devices while cinema image content is being rendered on the cinema display.

18. The method of claim 17, wherein the wearable devices that automatically register with the media system are tracked based on one or more of: specific seat positions based on specific issued tickets to viewers of the wearable devices, fiducial markers embedded in cinema image content or in surround spatial areas to the cinema display, light rays encoded with device ID information, radio-frequency (RF) location detection, or specific zones of an audience area in the 3D space.

19. The method of claim 1, wherein a wearable device that includes the device display is among a plurality of wearable devices, located in a three-dimensional (3D) space, that are divided into a plurality of zones in an audience area in the 3D space; wherein first wearable devices in a first zone in the plurality of zones receive device image content from a first device image content server; wherein second wearable devices in a second zone in the plurality of zones receive device image content from a second device image content server.

20. The method of claim 1, further comprising tracking wearable devices with device sensor assemblies that are installed at one or more spatial installation locations in a three-dimensional (3D) space.

21. The method of claim 20, wherein at least one of the device sensor assemblies is at one of: a ceiling, a wall, a floor, spatial areas near the cinema display, spatial areas away from the cinema display, seating spaces, or backs of seats, in the 3D space.

* * * * *